United States Patent
Yoshikuwa et al.

(10) Patent No.: US 12,095,265 B2
(45) Date of Patent: Sep. 17, 2024

(54) POWER SUPPLY SYSTEM AND POWER SUPPLY DEVICE

(71) Applicants: Kawasaki Jukogyo Kabushiki Kaisha, Kobe (JP); Nakanishi Metal Works Co., Ltd., Osaka (JP)

(72) Inventors: Eiji Yoshikuwa, Kobe (JP); Toshiyuki Tsujimori, Kobe (JP); Hideshi Yamane, Kobe (JP); Shoichi Miyao, Kobe (JP); Yoshihiro Okazaki, Osaka (JP); Ryoichi Kitaguchi, Nara (JP); Yuichi Otsuji, Matsubara (JP); Masayoshi Hoshi, Takatsuki (JP); Shigetomo Matsui, Higashiosaka (JP); Kanji Matsushima, Kobe (JP); Hiromu Wakayama, Kobe (JP)

(73) Assignees: KAWASAKI JUKOGYO KABUSHIKI KAISHA, Kobe (JP); NAKANISHI METAL WORKS CO., LTD., Osaka (JP)

( * ) Notice: Subject to any disclaimer, the term of this patent is extended or adjusted under 35 U.S.C. 154(b) by 190 days.

(21) Appl. No.: 17/612,222

(22) PCT Filed: May 21, 2020

(86) PCT No.: PCT/JP2020/020176
§ 371 (c)(1),
(2) Date: Nov. 18, 2021

(87) PCT Pub. No.: WO2020/235652
PCT Pub. Date: Nov. 26, 2020

(65) Prior Publication Data
US 2022/0255318 A1    Aug. 11, 2022

(30) Foreign Application Priority Data

May 21, 2019  (JP) ................................. 2019-095312

(51) Int. Cl.
 *H02J 3/00* (2006.01)
 *B25J 19/00* (2006.01)

(52) U.S. Cl.
 CPC ............ *H02J 3/007* (2020.01); *B25J 19/005* (2013.01)

(58) Field of Classification Search
 CPC ...... H02J 3/007; H02J 7/0042; H02J 7/00032; H02J 7/0013; H02J 7/342; H02J 7/0063;
 (Continued)

(56) References Cited

U.S. PATENT DOCUMENTS 9,937,621 B2    4/2018  Zevenbergen et al.
10,549,915 B1 *  2/2020  Theobald .................. B25J 9/00
 (Continued)

FOREIGN PATENT DOCUMENTS

| CN | 204309756 U | 5/2015 |
|---|---|---|
| JP | 59-102579 A | 6/1984 |

(Continued)

*Primary Examiner* — Richard Tan
(74) *Attorney, Agent, or Firm* — XSENSUS LLP

(57) ABSTRACT

A power supply system includes a movable power supply device including a first power storage device, a robot including a second power storage device, and a controller, and the controller performs control for conveying the first power storage device to the robot by using the power supply device, on the basis of information about an amount of power stored in the second power storage device.

19 Claims, 22 Drawing Sheets

(58) Field of Classification Search
CPC .... H02J 13/00001; B25J 19/005; B25J 5/007; B25J 5/00; B25J 19/00; B60L 2240/622; B60L 2260/32; B60L 53/80; G05D 2201/0216; G05D 1/0291
USPC .......................................................... 307/18
See application file for complete search history.

(56) References Cited

U.S. PATENT DOCUMENTS

| | | | |
|---|---|---|---|
| 11,400,829 B1* | 8/2022 | Hajimiri | ................. B60L 53/68 |
| 2006/0276150 A1* | 12/2006 | Ogasawara | ............ G08G 1/091 |
| | | | 455/152.1 |
| 2009/0306989 A1* | 12/2009 | Kaji | ........................ G10L 15/22 |
| | | | 704/270 |
| 2016/0368464 A1* | 12/2016 | Hassounah | ............. B60L 53/80 |
| 2019/0224852 A1 | 7/2019 | Choi et al. | |
| 2020/0238848 A1* | 7/2020 | Vliet | .................... B60L 53/305 |

FOREIGN PATENT DOCUMENTS

| | | |
|---|---|---|
| JP | 6-133411 A | 5/1994 |
| JP | 2014-144490 A | 8/2014 |
| JP | 2017-112806 A | 6/2017 |
| JP | 2018-145750 A | 9/2018 |
| KR | 10-2018-0039977 A | 4/2018 |
| WO | 2017/030188 A1 | 2/2017 |

\* cited by examiner

POWER SUPPLY SYSTEM AND POWER SUPPLY DEVICE

CROSS-REFERENCE TO RELATED APPLICATIONS

The present application is based on PCT filing PCT/JP2020/020176, filed May 21, 2020, which claims priority to JP 2019-095312, filed May 21, 2019, the entire contents of each are incorporated herein by reference.

TECHNICAL FIELD

The present disclosure relates to a power supply system and a power supply device.

BACKGROUND ART

In recent years, a work robot including a traveling device has been used in order to enable work in various places. For example, PTL 1 discloses a work robot including a moving mechanism and a work arm. The work robot of PTL 1 includes a power storage device, and performs work while consuming the power of the power storage device. When the amount of power remaining in the power storage device of the work robot becomes small, a power supply robot including a moving mechanism connects to the work robot to supply and charge the work robot with the power of a power storage device of the power supply robot.

CITATION LIST

Patent Literature

PTL 1: Japanese Laid-Open Patent Publication No. H06-133411

SUMMARY OF INVENTION

Technical Problem

Since the power supply robot of PTL 1 supplies and charges the power storage device of the work robot with the power of the power storage device included in the power supply robot, the time taken for supplying and charging becomes long. Therefore, when it is necessary to supply and charge work robots with power, the power supply robot cannot supply and charge each work robot with power at the timing required by each work robot, in some cases.

Therefore, an object of the present disclosure is to provide a power supply system and a power supply device which can reduce the time taken for power supply to a robot.

Solution to Problem

In order to achieve the above object, a power supply system according to an aspect of the present disclosure includes: a movable power supply device including a first power storage device; a robot including a second power storage device; and a controller, and the controller performs control for conveying the first power storage device to the robot by using the power supply device, on the basis of information about an amount of power stored in the second power storage device.

A power supply device according to an aspect of the present disclosure is a movable power supply device including: a first power storage device; and a controller that performs control for conveying the first power storage device to a robot, on the basis of information about an amount of power stored in a second power storage device included in the robot.

Advantageous Effects of Invention

According to the technology of the present disclosure, it is possible to reduce the time taken for power supply to a robot.

DESCRIPTION OF EMBODIMENTS

Embodiments

Hereinafter, embodiments of the present disclosure will be described with reference to the drawings. The embodiments described below are all comprehensive or specific examples. In addition, among the components in the following embodiments, the components not described in the independent claims which represent broadest concepts are described as optional components. Moreover, each figure in the accompanying drawings is a schematic view and is not necessarily exactly illustrated. Furthermore, in each figure, substantially the same components are designated by the same reference signs, and the repetitive description thereof may be omitted or simplified.

<Configuration of Power Supply System 1>

Figure 1:
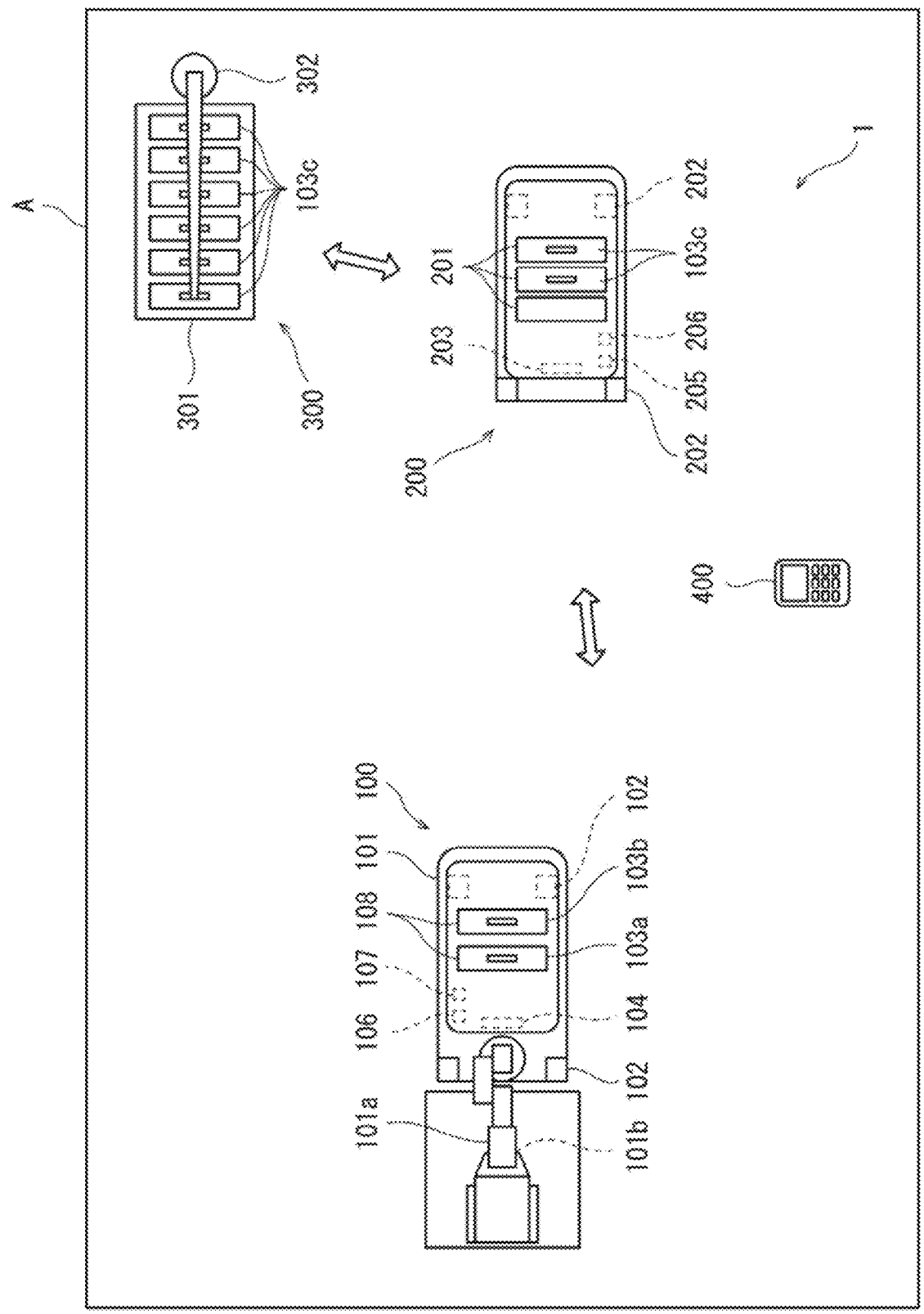
FIG. 1 is a plan view showing an example of the configuration of a power supply system according to an embodiment.
Figure 2:
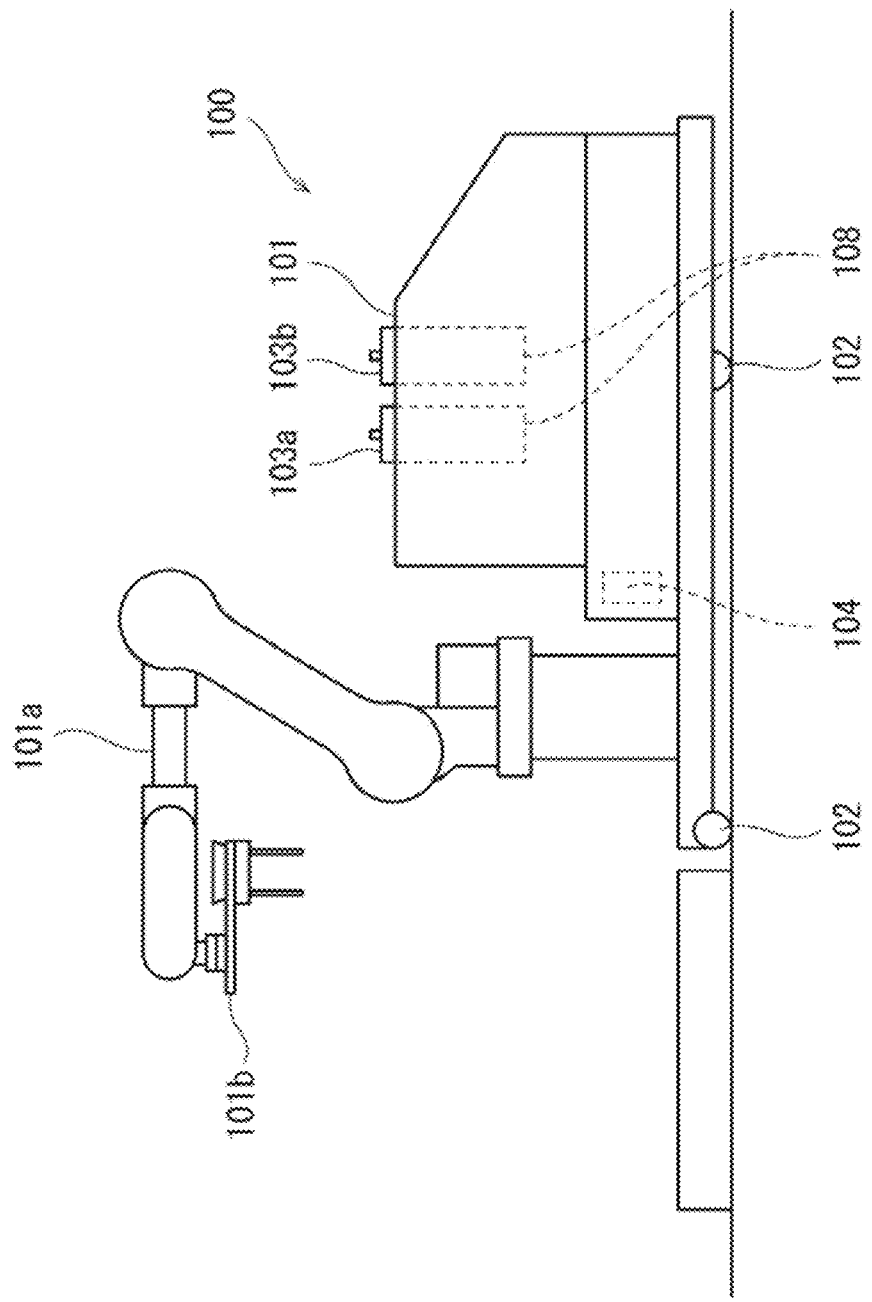
FIG. 2 is a side view showing an example of the configuration of a robot according to the embodiment.
Figure 3:
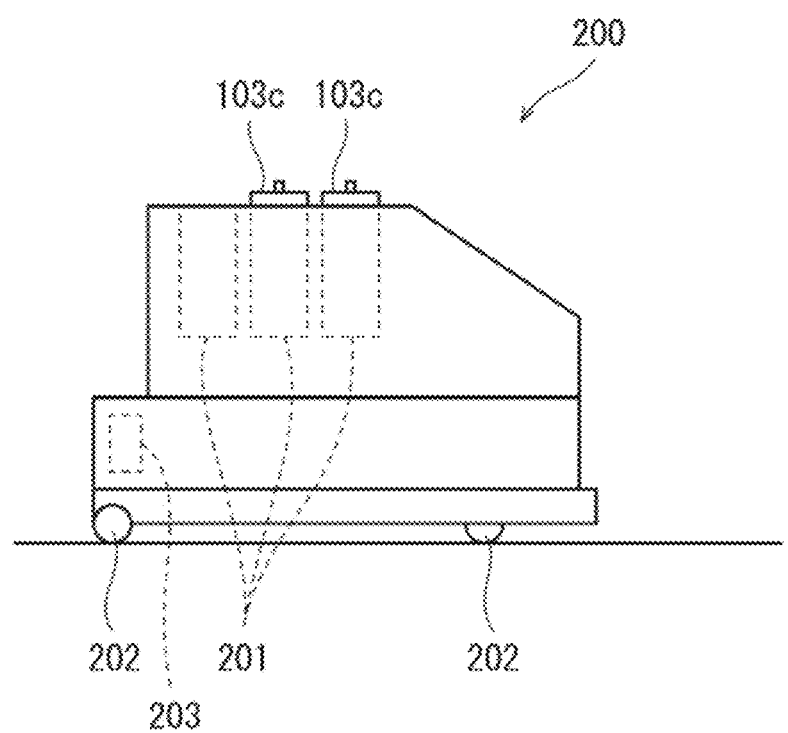
FIG. 3 is a side view showing an example of the configuration of a power supply device according to the embodiment.

FIG. 1 is a plan view showing an example of the configuration of a power supply system 1 according to an embodiment. FIG. 2 is a side view showing an example of the configuration of a robot 100 according to the embodiment. FIG. 3 is a side view showing an example of the configuration of a power supply device 200 according to the embodiment. As shown in FIG. 1 to FIG. 3, the power supply system 1 includes one or more robots 100, one or more power supply devices 200, and a power supply source 300.

Each robot 100 includes a robot main body 101 and a traveling device 102. The traveling device 102 travels on a floor surface or the like to move the robot 100 to a desired location. The traveling device 102 includes traveling means, such as wheels or crawlers (also referred to as "caterpillars (registered trademark)"). The robot main body 101 performs a desired operation, such as work, at a desired location. For example, the robot main body 101 includes one or more arms 101a and a manipulator 101b at the tip of each arm 101a, and performs work using the arm 101a and the manipulator 101b. The manipulator 101b can hold an object, for example, by grasping, sucking, or scooping up the object. In the present embodiment, the robot 100 is a work robot, but is not limited thereto and may be any robot.

The robot 100 also includes power storage devices 103a and 103b and a robot controller 104. The robot controller 104 controls the operation of the entire robot 100, such as the robot main body 101 and the traveling device 102. The power storage devices 103a and 103b have the same configuration and each include a storage battery, such as a secondary battery. The power storage devices 103a and 103b constitute a power source of the robot 100. The secondary battery is a battery capable of charging and discharging power. Examples of the secondary battery include lead storage batteries, lithium-ion secondary batteries, nickel-hydrogen storage batteries, and nickel-cadmium storage batteries. In the present embodiment, the robot 100 selects and uses one of the power storage device 103a and the power storage device 103b as a power source, although not limited thereto. However, the robot 100 may use both the power storage device 103a and the power storage device 103b. The power storage devices 103a and 103b are an example of a second power storage device.

The power supply source 300 is a facility in which one or more power storage devices 103c are housed. For example, the power supply source 300 is arranged at a work place A, for example, in a factory or a warehouse where the robot 100 is arranged. Each power storage device 103c has the same configuration as those of the power storage devices 103a and 103b, and functions as a power source for the robot 100 when being mounted on the robot 100. In the following, when the power storage devices 103a, 103b, and 103c are not distinguished from each other, the power storage device is sometimes referred to simply as "power storage device 103". Further, the power storage device mounted on the robot 100 is sometimes referred to as "power storage device 103a or 103b", and the power storage device not mounted on the robot 100 is sometimes referred to as "power storage device 103c". The power storage device 103c is an example of a first power storage device.

The power supply source 300 includes a charging device 301. The charging device 301 receives power supplied from a power system, such as a commercial power supply, and charges the power storage device 103c by using the supplied power. The charging device 301 may be connected to a power storage facility which is not shown, and may receive power supplied from the power storage facility. In addition, the power supply source 300 may include a conveying device 302 which puts a housed power storage device 103c into the power supply device 200 and which removes a power storage device 103c put in the power supply device 200. In the present embodiment, the conveying device 302 is a crane, but is not limited thereto, and may be, for example, a robot including an arm and a manipulator.

Each power supply device 200 is a device which puts one or more power storage devices 103c therein and conveys the one or more power storage devices 103c to the robot 100. That is, the power supply device 200 supplies power to the robot 100 by conveying the power storage device 103c to the robot 100. In the present embodiment, the robot 100 replaces at least one of the power storage devices 103a and 103b with the power storage device 103c of the power supply device 200. The power supply device 200 includes a traveling device 202, and a power supply controller 203. The traveling device 202 travels on a floor surface or the like to move the power supply device 200 to a target robot 100. The traveling device 202 includes traveling means, such as wheels or crawlers. The power supply controller 203 controls the operation of the entire power supply device 200. The power supply controller 203 is an example of a controller.

<Configuration of Robot 100>

Figure 4:
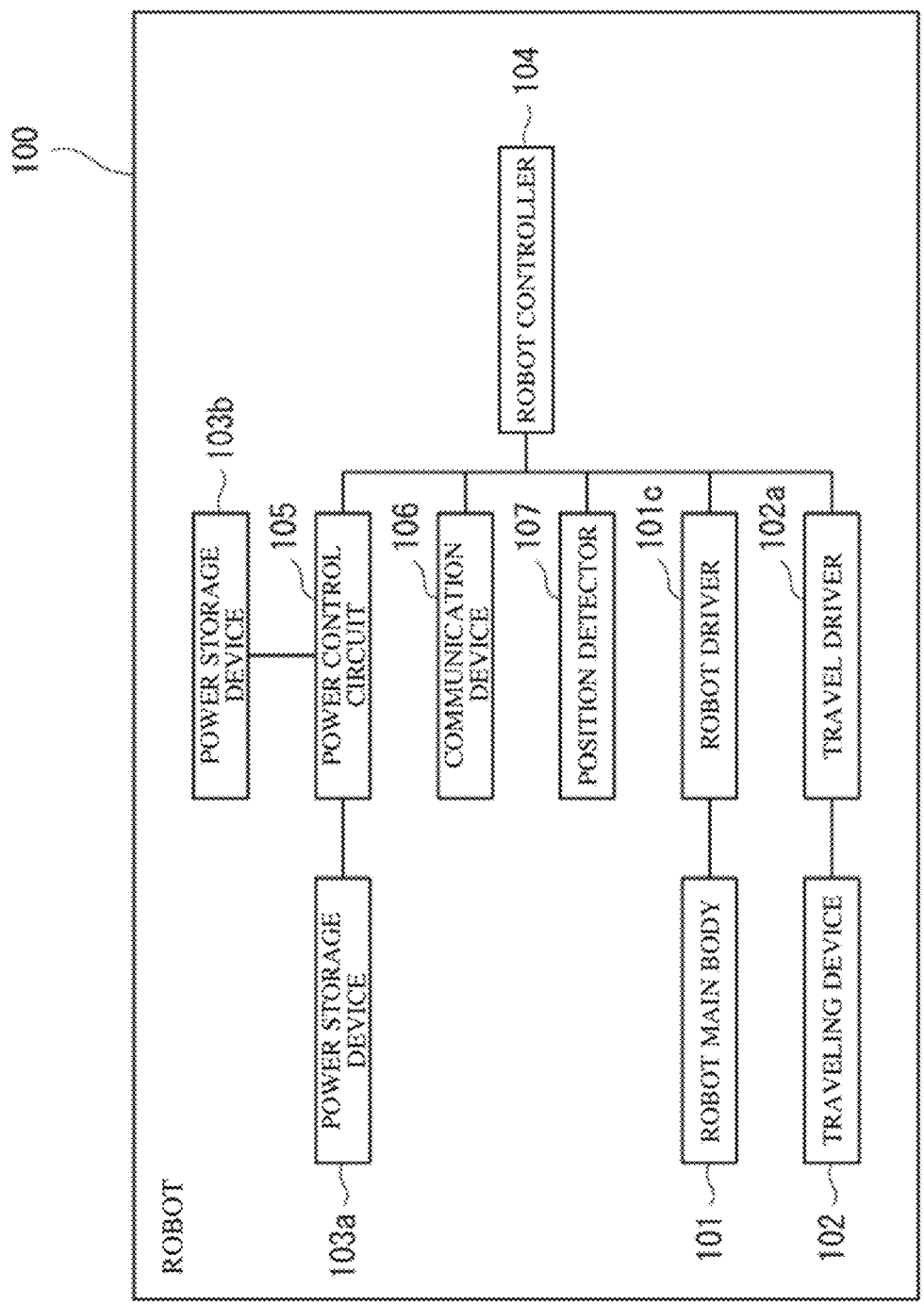
FIG. 4 is a block diagram showing an example of the configuration of the robot according to the embodiment.

FIG. 4 is a block diagram showing an example of the configuration of the robot 100 according to the embodiment. As shown in FIG. 1, FIG. 2, and FIG. 4, the robot 100 includes the robot main body 101, the traveling device 102, the power storage devices 103a and 103b, the robot controller 104, a power control circuit 105, a communication device 106, a position detector 107, and housing portions 108 as components. Not all of these components are essential.

The housing portions 108 house therein the power storage devices 103a and 103b. In the present embodiment, carry-in/out ports of the housing portions 108 are open, and the power storage devices 103a and 103b are allowed to be freely put into or taken out from the housing portions 108 through the carry-in/out ports, although not limited thereto.

In the present embodiment, the carry-in/out ports are open upward, although not limited thereto.

Terminals may be disposed in the housing portions 108. When the power storage devices 103a and 103b are housed in the housing portions 108, the power storage devices 103a and 103b and the robot 100 may be automatically electrically connected to each other via the terminals. When the power storage devices 103a and 103b are taken out from the housing portions 108, the electrical connection may be automatically released. Alternatively, the robot main body 101 may perform electrical connection with and disconnection from the power storage devices 103a and 103b.

The robot main body 101 includes a robot driver 101c, and the robot driver 101c includes drivers which are, for example, electric motors, such as servomotors, arranged on joints of the arm 101a and the manipulator 101b or the like. The robot driver 101c operates the joints of the arm 101a, the manipulator 101b, etc., under the control of the robot controller 104. In the present embodiment, the arm 101a is a vertical articulated arm having links and joints which sequentially connect the links, but is not limited thereto. The robot main body 101 is an example of a third transfer device.

The traveling device 102 includes a travel driver 102a, and the travel driver 102a includes an electric motor which drives the traveling means of the traveling device 102, an electric motor which changes the traveling direction of the traveling means, etc. The travel driver 102a causes the traveling device 102 to travel in a desired direction under the control of the robot controller 104.

The components such as the power storage devices 103a and 103b, the robot controller 104, the power control circuit 105, the communication device 106, the position detector 107, the robot driver 101c, and the travel driver 102a are electrically connected to each other. The connection relationship between each component is not limited to the relationship in FIG. 4. The connection between each component may be any wired or wireless connection.

The configurations of the power storage devices 103a and 103b are as described above.

The power control circuit 105 electrically connects the power storage device 103a or 103b and each component of the robot 100 to supply the power of the power storage device 103a or 103b to each component of the robot 100, under the control of the robot controller 104. The power control circuit 105 may include a switching circuit which switches the connection with the power storage device 103a or 103b, and may include a DC-AC conversion circuit and perform power conversion.

The communication device 106 includes a wireless communication circuit and wirelessly communicates with the power supply device 200, etc. The communication device 106 may communicate with an individual power supply device 200, or may communicate with power supply devices 200 and transmit information thereto all at once. For example, the communication device 106 transmits information about the amounts of power stored in the power storage devices 103a and 103b, position information of the robot 100, etc., to the power supply device 200 under the control of the robot controller 104.

The information about the amounts of power stored in the power storage devices 103a and 103b may include information indicating the level of the amount of power stored, such as the amount of power remaining in the storage battery, the SOC (State Of Charge), the DOD (Depth Of Discharge), and the voltage of the storage battery, and the like, may include information, such as the voltage value and the current value of the power storage device, for detecting the level of the amount of power stored, and may include a command for requesting or instructing power supply to or replacement of the power storage device 103a or 103b. The information about the amounts of power stored in the power storage devices 103a and 103b may include identification information, such as an ID, of the robot 100 on which these power storage devices are mounted.

Moreover, the communication device 106 may wirelessly communicate with a device other than the power supply device 200. For example, the communication device 106 may communicate with a terminal device 400 which transmits a command to the robot 100, acquire information such as the work place and work contents of the robot 100 from the terminal device 400, and output the information to the robot controller 104.

For the wireless communication used by the communication device 106, a wireless LAN (Local Area Network), such as Wi-Fi (registered trademark) (Wireless Fidelity), may be applied, short-range wireless communication, such as Bluetooth (registered trademark) and ZigBee (registered trademark), may be applied, or any other wireless communication may be applied.

The position detector 107 is a device which detects the position of the robot 100, and outputs information on the detected position of the robot 100 to the robot controller 104. The position detector 107 includes a positioning device, such as a GPS (Global Positioning System) receiver and an IMU (Inertial Measurement Unit).

For example, the position detector 107 may acquire the three-dimensional coordinates of the robot 100 on Earth via the GPS receiver and output the three-dimensional coordinates to the robot controller 104. The position detector 107 may acquire the measured values of a three-axis acceleration sensor and a three-axis angular velocity sensor included in the IMU and output the measured values to the robot controller 104. The position detector 107 may acquire the three-dimensional coordinates of the robot 100 and the measured values of the IMU and output the three-dimensional coordinates and the measured values to the robot controller 104. It is possible to calculate the moving direction, the moving distance, and the orientation of the robot 100 by using the measured values of the IMU. In the present embodiment, the robot controller 104 detects the position and the orientation of the robot 100 by using the information acquired from the position detector 107, but the position detector 107 may detect the position and the orientation of the robot 100. The position detector 107 may acquire the position of the robot 100 from an external device outside the robot 100, which manages or measures the positions of the robot 100 and the like.

Figure 5:
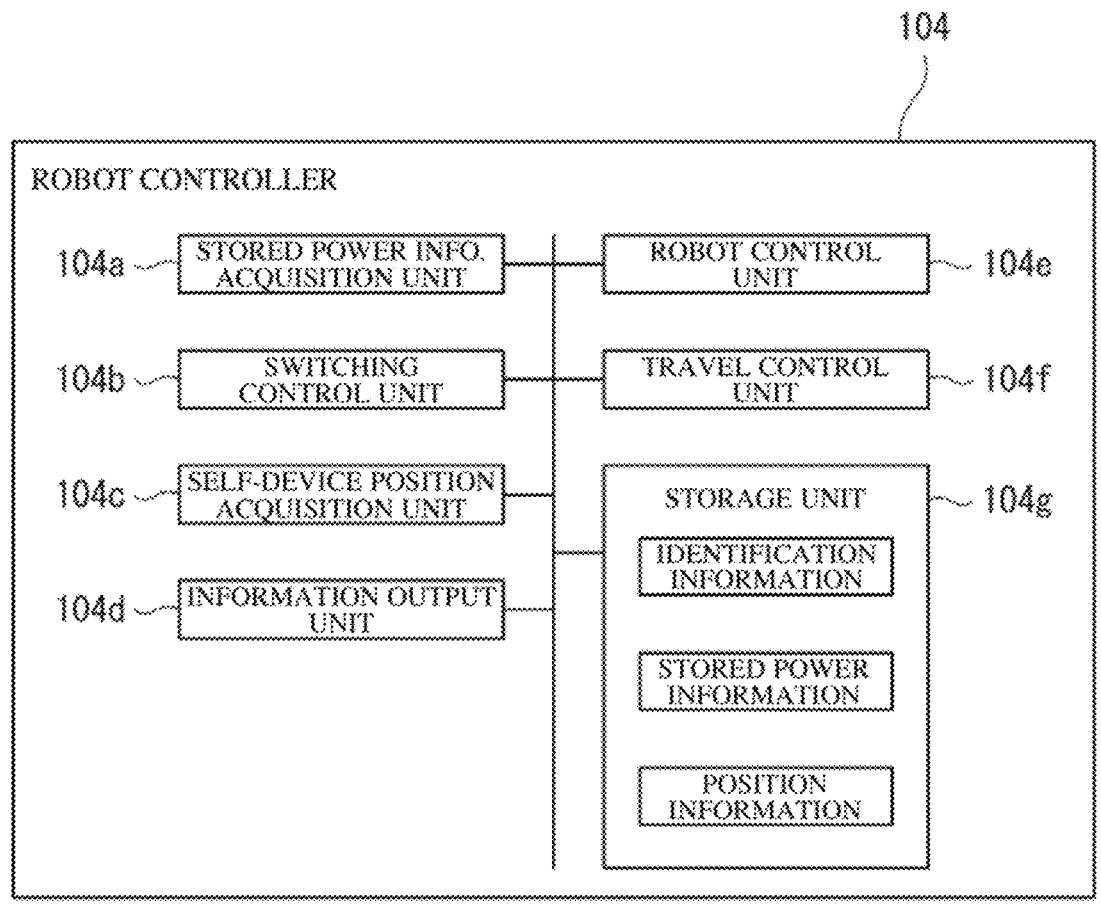
FIG. 5 is a block diagram showing an example of the functional configuration of a robot controller according to the embodiment.

The configuration of the robot controller 104 will be described. FIG. 5 is a block diagram showing an example of the functional configuration of the robot controller 104 according to the embodiment. As shown in FIG. 5, the robot controller 104 includes a stored power information acquisition unit 104a, a switching control unit 104b, a self-device position acquisition unit 104c, an information output unit 104d, a robot control unit 104e, a travel control unit 104f, and a storage unit 104g as functional components. Not all of these functional components are essential.

The functions of the components such as the stored power information acquisition unit 104a, the switching control unit 104b, the self-device position acquisition unit 104c, the information output unit 104d, the robot control unit 104e, and the travel control unit 104f may be realized by a computer system (not shown) which includes a processor, such as a CPU (Central Processing Unit), a volatile memory, such as a RAM (Random Access Memory), a non-volatile memory, such as a ROM (Read-Only Memory), etc. Some or all of the functions of the above components may be realized by the CPU using the RAM as a work area to execute a program recorded in the ROM. Some or all of the functions of the above components may be realized by the above computer system, may be realized by a dedicated hardware circuit, such as an electronic circuit or an integrated circuit, or may be realized by a combination of the above computer system and the above hardware circuit.

The storage unit 104g can store therein various kinds of information and allows the stored information to be read. The storage unit 104g is realized by a storage device, such as a semiconductor memory such as a volatile memory and a non-volatile memory, a hard disk, and an SSD (Solid State Drive). The storage unit 104g stores therein identification information of the robot 100, stored power information of the power storage devices 103a and 103b, position information of the robot 100, etc. The storage unit 104g may store therein a program to be executed by each component of the robot controller 104.

The stored power information of the power storage devices 103a and 103b includes information about the amounts of power stored in the power storage devices 103a and 103b. The stored power information may include not only information about the present amounts of power stored in the power storage devices 103a and 103b but also information about the past amounts of power stored in the power storage devices 103a and 103b, together with the detection times thereof. Moreover, the stored power information may include a threshold for the level of the amount of power stored at which charging of the power storage devices 103a and 103b becomes necessary.

The position information of the robot 100 includes information on the position and the orientation of the robot 100 and the like. The position information may include not only the present position information of the robot 100 but also the past position information of the robot 100 together with the detection times thereof. Moreover, the position information may include information on a map of the place where the robot 100 works, or information on the position and the orientation of the robot 100 and the like associated with the map.

The stored power information acquisition unit 104a acquires the levels of the amounts of power stored in the power storage devices 103a and 103b. Specifically, the stored power information acquisition unit 104a acquires the voltage value, the current value, etc., of the power storage devices 103a and 103b via the power control circuit 105, detects the level of the amount of power stored, such as SOC, by using the voltage value, current value, etc., and stores the level in the storage unit 104g.

The switching control unit 104b controls the power control circuit 105 and controls the electrical connection between the power storage device 103a or 103b and each component of the robot 100. For example, the switching control unit 104b electrically connects one of the power storage devices 103a and 103b and each component of the robot 100 in accordance with the levels of the amounts of power stored in the power storage devices 103a and 103b, etc.

The self-device position acquisition unit 104c detects the position and the orientation of the robot 100 by using the information acquired from the position detector 107, and stores the position and the orientation of the robot 100 in the storage unit 104g.

The information output unit 104d transmits the information about the amounts of power stored in the power storage devices 103a and 103b, to the power supply device 200 or the like via the communication device 106. For example, the information output unit 104d may output the information about the amounts of power stored in the power storage devices 103a and 103b when the level of the present amount of power stored in the power storage device 103a or 103b becomes equal to or lower than the threshold, or may periodically output the information about the amounts of power stored in the power storage devices 103a and 103b. The information to be outputted may be the information about the amounts of power stored in both the power storage devices 103a and 103b, or may be the information about the amount of power stored in one of the power storage devices 103a and 103b.

The robot control unit 104e controls the operation of the robot main body 101, specifically the operation of the arm 101a and the manipulator 101b, by controlling the robot driver 101c. For example, the robot control unit 104e causes the arm 101a and the manipulator 101b to perform not only operation for work but also operation for replacing the power storage device 103a or 103b of the robot 100 with the power storage device 103c of the power supply device 200. The robot control unit 104e performs control according to a program corresponding to a preset command or a command acquired via the communication device 106.

The travel control unit 104f controls the operation of the traveling device 102 by controlling the travel driver 102a. The travel control unit 104f moves the robot 100 to a preset work point or a work point acquired via the communication device 106, by using the position information of the robot 100.

<Configuration of Power Supply Device 200>

Figure 6:
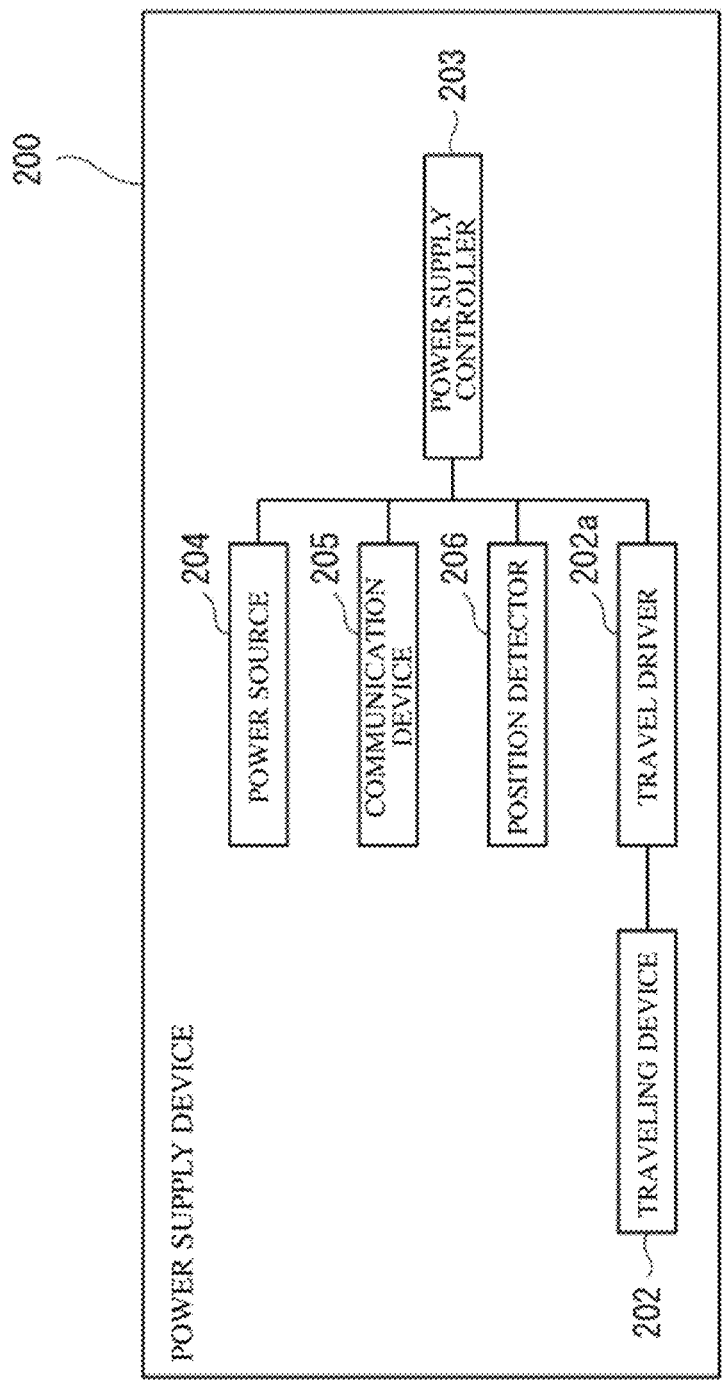
FIG. 6 is a block diagram showing an example of the configuration of the power supply device according to the embodiment.

FIG. 6 is a block diagram showing an example of the configuration of the power supply device 200 according to the embodiment. As shown in FIG. 1, FIG. 3, and FIG. 6, the power supply device 200 includes housing portions 201, the traveling device 202, the power supply controller 203, a power source 204, a communication device 205, and a position detector 206 as components. Not all of these components are essential.

The housing portions 201 house therein one or more power storage devices 103c. Carry-in/out ports of the housing portions 201 are open, and the power storage devices 103c are allowed to be freely put into or taken out from the housing portions 201 through the carry-in/out ports. In the present embodiment, the carry-in/out ports are open upward, although not limited thereto.

The traveling device 202 includes a travel driver 202a, and the travel driver 202a includes an electric motor which drives the traveling means of the traveling device 202, an electric motor which changes the traveling direction of the traveling means, etc. The travel driver 202a causes the traveling device 202 to travel in a desired direction under the control of the power supply controller 203.

The components such as the power supply controller 203, the power source 204, the communication device 205, the position detector 206, and the travel driver 202a are electrically connected to each other. The connection relationship between each component is not limited to the relationship in FIG. 6. The connection between each component may be any wired or wireless connection.

The power source 204 supplies power to each component of the power supply device 200 under the control of the power supply controller 203. The power source 204 may include a power storage device, or may be connected to a power system arranged separately from the power supply device 200, via a power line. The power source 204 may be configured such that, as the power storage device of the power source 204, the power storage device 103*c* put in the power supply device 200 is used, or a power storage device mounted thereon separately from the power storage device 103*c* is used.

The communication device 205 includes a wireless communication circuit and wirelessly communicates with the communication device 106 of the robot 100, etc. The wireless communication used by the communication device 205 is the same as that by the communication device 106. The communication device 205 may communicate with an individual robot 100, or may communicate with robots 100. The communication device 205 receives, from the robot 100, the information about the amount of power stored in the power storage devices 103*a* and 103*b* thereof, the position information of the robot 100, etc.

Moreover, the communication device 205 may wirelessly communicate with a device other than the robot 100. For example, the communication device 205 may communicate with the communication device 205 of another power supply device 200. For example, when one robot 100 transmits, to power supply devices 200, a command for requesting or instructing power supply, each power supply device 200 may transmit the position information of the power supply device 200 or the distance between the power supply device 200 and the robot 100 to the other power supply devices 200. Then, each power supply device 200 may determine to convey the power storage device 103*c* to the robot 100 when the distance from the power supply device 200 to the robot 100 is the shortest as compared to those of the other power supply devices 200. Accordingly, efficient conveyance of the power storage device 103*c* to the robot 100 is enabled.

Alternatively, when one power supply device 200 receives a command for requesting or instructing power supply from robots 100, the power supply device 200 may determine the robot 100 whose distance from the power supply device 200 is the shortest, as a conveyance target of the power storage device 103*c*. Then, the power supply device 200 may transmit the identification information of the robot 100 that is the conveyance target, to the other power supply devices 200. Accordingly, redundancy of power supply devices 200 that set one robot 100 as a conveyance target is suppressed.

The position detector 206 is a device which detects the position of the power supply device 200, and outputs information on the detected position of the power supply device 200 to the power supply controller 203. The position detector 206 includes a positioning device, such as a GPS receiver and an IMU. In the present embodiment, the power supply controller 203 detects the position and the orientation of the power supply device 200 by using the information acquired from the position detector 206, but the position detector 206 may detect the position and the orientation of the power supply device 200. The position detector 206 may acquire the position of the power supply device 200 from an external device outside the power supply device 200, which manages or measures the positions of the power supply device 200 and the like.

Figure 7:
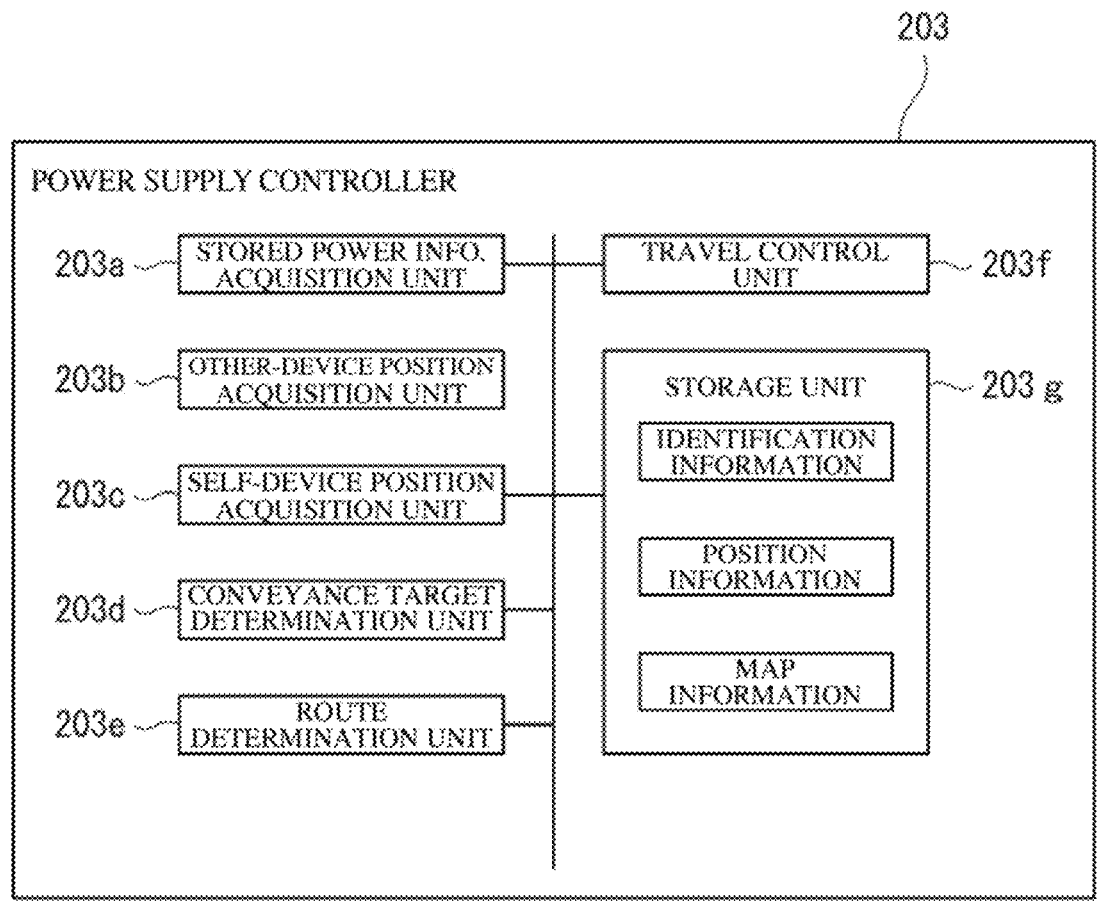
FIG. 7 is a block diagram showing an example of the functional configuration of a power supply controller of the power supply device according to the embodiment.

The configuration of the power supply controller 203 will be described. FIG. 7 is a block diagram showing an example of the functional configuration of the power supply controller 203 of the power supply device 200 according to the embodiment. As shown in FIG. 7, the power supply controller 203 includes a stored power information acquisition unit 203*a*, an other-device position acquisition unit 203*b*, a self-device position acquisition unit 203*c*, a conveyance target determination unit 203*d*, a route determination unit 203*e*, a travel control unit 203*f*, and a storage unit 203*g* as functional components. Not all of these functional components are essential.

The functions of the components such as the stored power information acquisition unit 203*a*, the other-device position acquisition unit 203*b*, the self-device position acquisition unit 203*c*, the conveyance target determination unit 203*d*, the route determination unit 203*e*, and the travel control unit 203*f* may be realized by a computer system which includes a processor, such as a CPU, a volatile memory, such as a RAM, a non-volatile memory, such as a ROM, etc. Some or all of the functions of the above components may be realized by the above computer system, may be realized by a dedicated hardware circuit, such as an electronic circuit or an integrated circuit, or may be realized by a combination of the above computer system and the above hardware circuit.

The storage unit 203*g* can store therein various kinds of information and allows the stored information to be read. The storage unit 203*g* is realized by a storage device, such as a semiconductor memory such as a volatile memory and a non-volatile memory, a hard disk, and an SSD. The storage unit 203*g* stores therein identification information of the power supply device 200, position information of the power supply device 200, map information, etc. The storage unit 203*g* may store therein a program to be executed by each component of the power supply controller 203.

The position information of the power supply device 200 includes information on the position and the orientation of the power supply device 200 and the like. The position information may include not only the present position information of the power supply device 200 but also the past position information of the power supply device 200 together with the detection times thereof.

The map information includes information on a map of the place where the power supply device 200 is arranged. For example, the map may be a map of an area where one power supply device 200 conveys a power storage device 103*c*, or may be a map including the entire area where power supply devices 200 including this power supply device 200 convey power storage devices 103*c*.

The stored power information acquisition unit 203*a* acquires the information about the amounts of power stored in the power storage devices 103*a* and 103*b* from the robot 100 or the like via the communication device 205.

The other-device position acquisition unit 203*b* acquires the identification information and the position information of the robot 100 from the robot 100 or the like via the communication device 205. The other-device position acquisition unit 203*b* may store the identification information and the position information of the robot 100 in the storage unit 203*g* in association with each other.

The other-device position acquisition unit 203*b* may acquire identification information and position information of another power supply device 200 from said another power supply device 200 or the like via the communication device 205. Furthermore, the other-device position acquisition unit 203*b* may store the identification information and the position information of the other power supply device 200 in the storage unit 203*g* in association with each other.

The self-device position acquisition unit 203*c* detects the position and the orientation of the power supply device 200 by using the information acquired from the position detector 206, and stores the position and the orientation of the power supply device 200 in the storage unit 203*g*.

The conveyance target determination unit 203d acquires the information about the amounts of power stored in the power storage devices 103a and 103b of the robot 100, from the stored power information acquisition unit 203a, and determines whether to perform conveyance of the power storage device 103c to the robot 100. For example, the conveyance target determination unit 203d may determine conveyance of the power storage device 103c to the robot 100 whose level of the amount of power stored in the power storage device 103a or 103b is equal to or lower than a threshold. Alternatively, when the acquired information includes a command for requesting or instructing power supply to or replacement of the power storage device 103a or 103b, the conveyance target determination unit 203d may determine conveyance to the robot 100 that has transmitted this command.

Moreover, when the conveyance target determination unit 203d acquires information about the amounts of power stored in robots 100 that are power supply targets, the conveyance target determination unit 203d may determine a robot 100 as a conveyance target on the basis of the distance between each robot 100 and the power supply device 200, the level of the amount of power stored in each robot 100, and/or the distance between each robot 100 and another power supply device 200, or the like. The information about the amount of power stored in a power supply target is information about an amount of power stored including the need to supply power to the power storage device 103a or 103b of the robot 100 or replace the power storage device, and may include information that the level of the amount of power stored in the power storage device 103a or 103b is equal to or lower than the threshold, and/or a command for requesting or instructing power supply to or replacement of the power storage device 103a or 103b, or the like.

In a first determination method, the conveyance target determination unit 203d may calculate the distance between each robot 100 and the power supply device 200 from the position of each robot 100 and the position of the power supply device 200, and determine the robot 100 having the shortest distance as a conveyance target of the power storage device 103c.

In a second determination method, the conveyance target determination unit 203d may determine the robot 100 having the lowest level of the amount of power stored therein among the respective robots 100, as a conveyance target.

In a third determination method, the conveyance target determination unit 203d may calculate the distance between each robot 100 and each power supply device 200 from the position of each robot 100 and the position of each of all the power supply devices 200. Furthermore, the conveyance target determination unit 203d may determine the robot 100 having the shortest distance from the power supply device 200 including this conveyance target determination unit 203d as compared to the other power supply devices 200, as a conveyance target.

Alternatively, the conveyance target determination unit 203d may determine a robot 100 as a conveyance target from among the robots 100 determined by at least two determination methods out of the first to third determination methods. That is, the conveyance target determination unit 203d may combine and use at least two of the first to third determination methods. For example, when the conveyance target determination unit 203d determines two or more robots 100 as conveyance targets by using one of the first to third determination methods, the conveyance target determination unit 203d may narrow down the robots 100 as conveyance targets by using another determination method.

The route determination unit 203e determines a route for moving the power supply device 200 to the robot 100 determined by the conveyance target determination unit 203d. Specifically, the route determination unit 203e acquires the position and the orientation of the robot 100 determined by the conveyance target determination unit 203d, the position and the orientation of the power supply device 200, and the map information stored in the storage unit 203g. The route determination unit 203e determines a target position and a target orientation of the power supply device 200 at the time of arrival at the robot 100, by using the acquired information. The route determination unit 203e determines a travel route of the power supply device 200 on the basis of the present and target positions and orientations of the power supply device 200 and the map information. The travel route includes the position of the route and may further include the traveling direction of the power supply device 200 on the route. The route determination unit 203e outputs information on the determined travel route to the travel control unit 203f.

Figure 8:
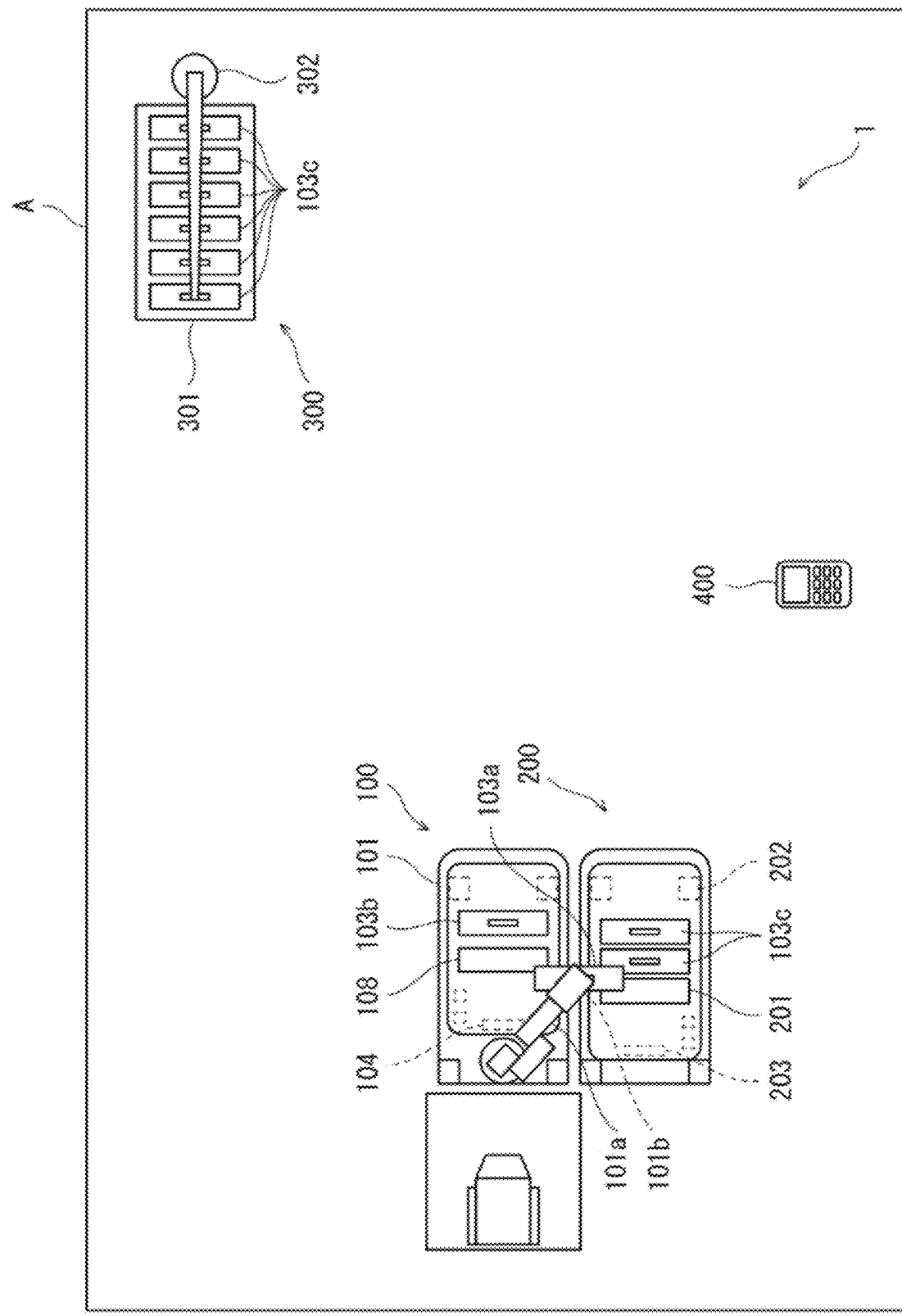
FIG. 8 is a plan view showing an example of a replacement state of power storage devices of the robot and the power supply device.
Figure 9:
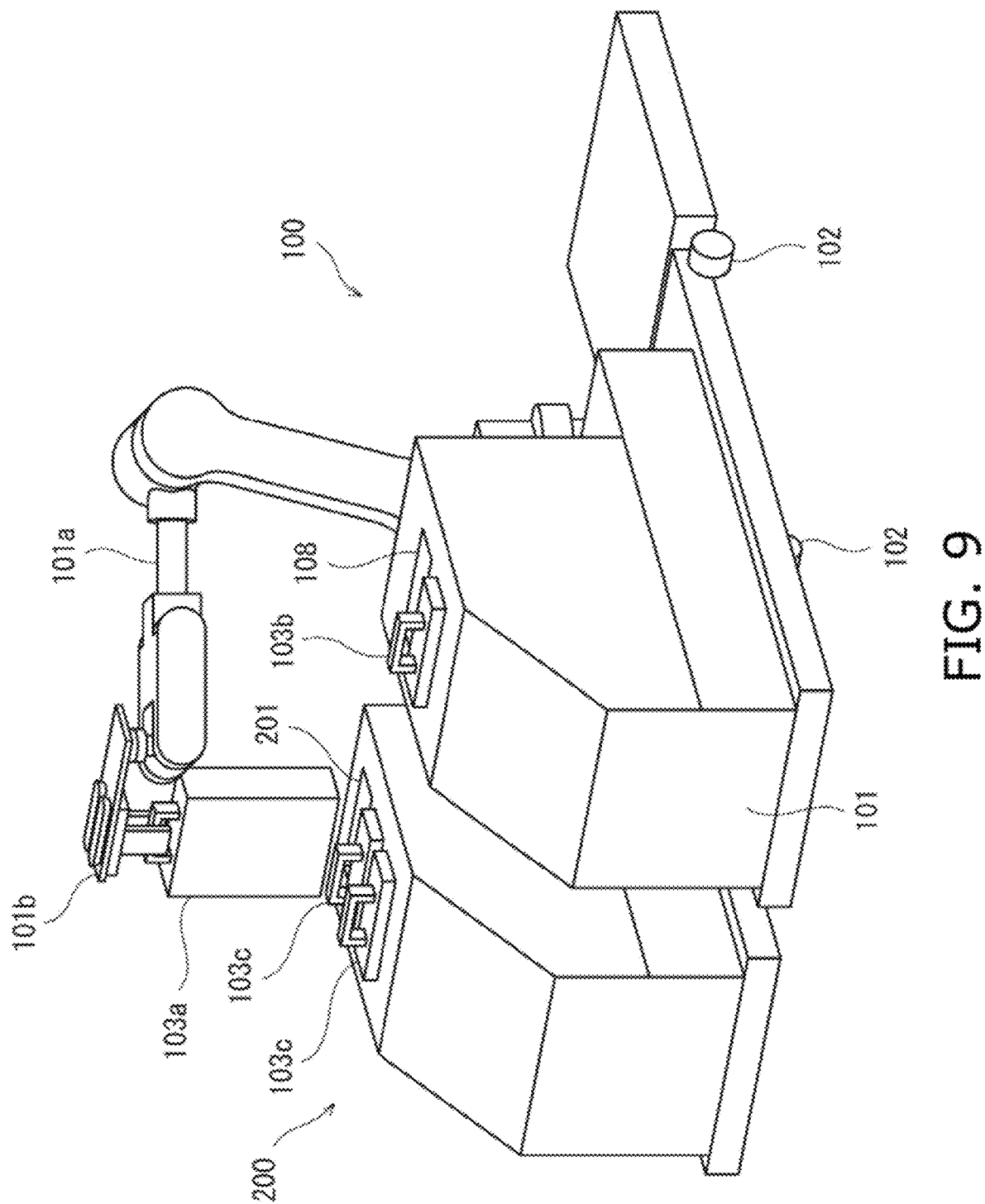
FIG. 9 is a perspective view showing an example of the replacement state of the power storage devices of the robot and the power supply device.

For example, as shown in FIG. 8 and FIG. 9, the route determination unit 203e determines a target position and a target orientation of the power supply device 200 such that the housing portions 201 of the power supply device 200 are located within the reach of the arm 101a of the robot 100. At this time, the robot 100 can replace the power storage device 103a or 103b with the power storage device 103c of the power supply device 200 by using the arm 101a and the manipulator 101b. FIG. 8 and FIG. 9 are a plan view and a perspective view showing an example of the replacement state of the power storage devices of the robot 100 and the power supply device 200.

The travel control unit 203f controls the operation of the traveling device 202 by controlling the travel driver 202a. The travel control unit 203f causes the power supply device 200 to travel according to the travel route acquired from the route determination unit 203e, to reach the target position with the target orientation with respect to a target robot 100. In addition, the travel control unit 203f may move the power supply device 200 to a predetermined location, such as a standby location, after replacement with the power storage device 103 for the robot 100. The travel route to the predetermined location may be a travel route opposite to the above travel route, or may be determined by the route determination unit 203e on the basis of the position and the orientation of the power supply device 200 and the position of the predetermined location. Alternatively, when the travel control unit 203f acquires, from the route determination unit 203e, a travel route to the robot 100 that is the next conveyance target, the travel control unit 203f may cause the power supply device 200 to travel according to this travel route.

<First Operation of Power Supply System 1>

Figure 10:
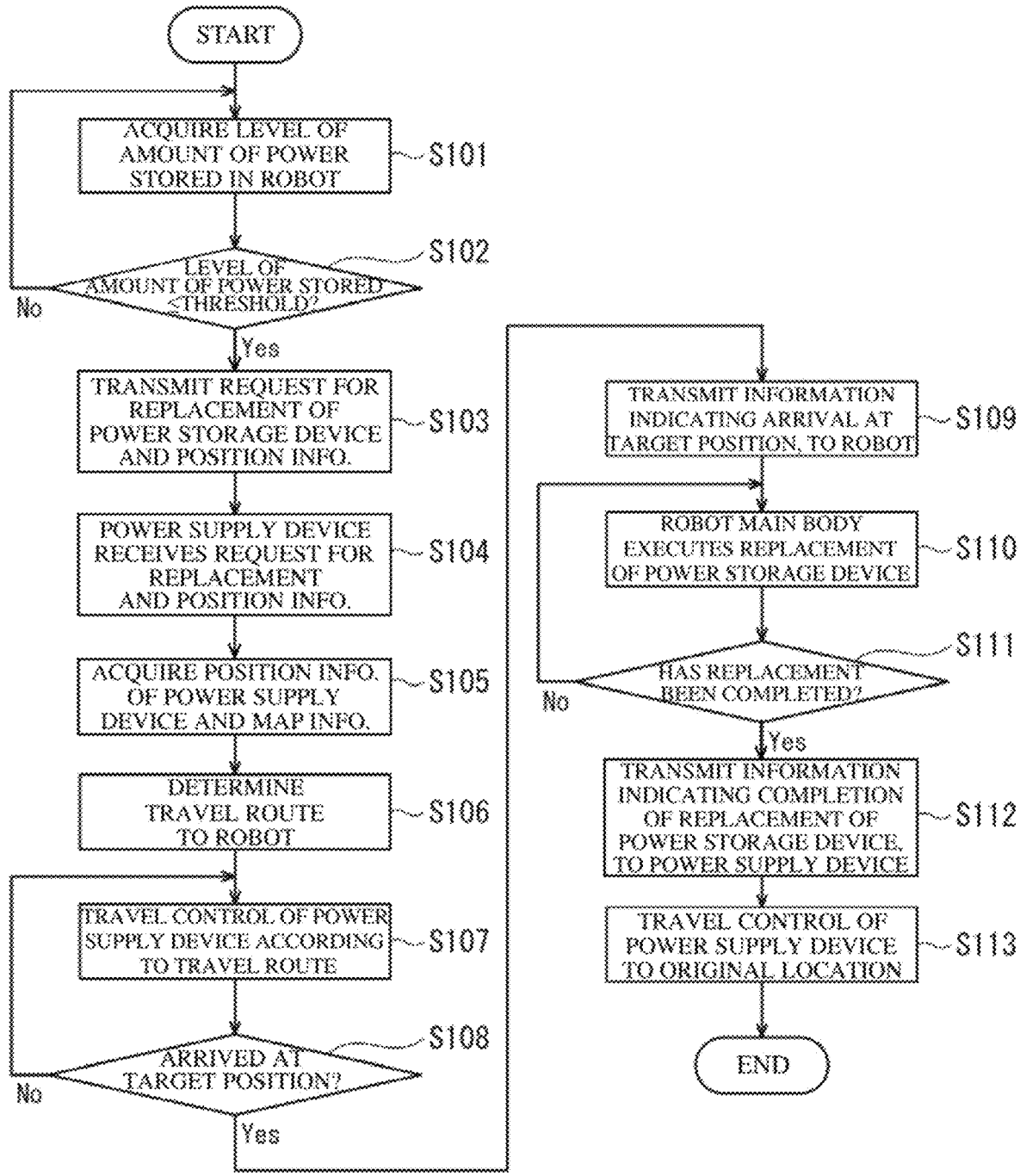
FIG. 10 is a flowchart showing an example of a first operation of the power supply system according to the embodiment.

A first operation of the power supply system 1 according to the embodiment will be described. The first operation is an example of the operation of the power supply system 1 in case that one robot 100 and one power supply device 200 exist in the work place of the robot 100. FIG. 10 is a flowchart showing an example of the first operation of the power supply system 1 according to the embodiment.

As shown in FIG. 1 and FIG. 10, the robot controller 104 of the robot 100 acquires the levels of the amounts of power stored in the power storage devices 103a and 103b (step S101). Next, the robot controller 104 determines whether the levels of the amounts of power stored in the power storage devices 103a and 103b are equal to or lower than a threshold (step S102). If at least one of the levels of the amounts of power stored in the power storage devices 103a and 103b is equal to or lower than the threshold (Yes in step S102), the robot controller 104 proceeds to step S103, and if both the levels of the amounts of power stored in the power storage devices 103a and 103b are higher than the threshold (No in step S102), the robot controller 104 returns to step S101.

In step S103, the robot controller 104 transmits information about the amount of power stored including a request for replacement of the power storage device 103a or 103b of the robot 100, and the position information of the robot 100 to the power supply device 200. Then, the power supply controller 203 of the power supply device 200 receives the above information (step S104).

In this example, the robot 100 operates by using the power of the power storage device 103a, and the power of the power storage device 103b is unused. Therefore, in step S103, the level of the amount of power stored in the power storage device 103a is equal to or lower than the threshold, and replacement of the power storage device 103a is requested. In addition, after a request for replacement of the power storage device 103a is transmitted, the robot controller 104 may release the electrical connection between the power storage device 103a and each component of the robot 100 and electrically connect the power storage device 103b and each component of the robot 100. This electrical connection switching may be performed at any timing before the replacement of the power storage device 103a is started.

Next, the power supply controller 203 acquires the position information of the power supply device 200 and the map information of the work place A which is a place where the power supply device 200 and the robot 100 are arranged, from the storage unit 203g (step S105). The power supply controller 203 may acquire the position information of the power supply device 200 from the position detector 206.

Next, the power supply controller 203 determines a travel route from the power supply device 200 to the robot 100 by using the position information of the robot 100, the position information of the power supply device 200, and the map information (step S106). The travel route is a travel route until the power supply device 200 reaches the target position with the target orientation with respect to the robot 100.

Next, the power supply controller 203 controls the travel driver 202a so as to cause the power supply device 200 to travel according to the determined travel route and reach the target position with the target orientation (step S107). The fully charged power storage device 103c may be put in the power supply device 200 in advance, or may be put into the power supply device 200 after information is received in step S104.

Next, the power supply controller 203 determines whether the power supply device 200 has reached the target position with the target orientation with respect to the robot 100, that is, has arrived at the target position (step S108). If the power supply device 200 has arrived at the target position (Yes in step S108), the power supply controller 203 proceeds to step S109, and if the power supply device 200 has not arrived at the target position (No in step S108), the power supply controller 203 returns to step S107.

In step S109, the power supply controller 203 transmits information indicating the arrival of the power supply device 200, to the robot 100. This transmission may be performed by wireless communication using the communication device 205. Alternatively, the transmission may be transmission using an output device (not shown) which outputs a signal such as light or sound to the robot 100, or the like.

Next, the robot controller 104 of the robot 100 causes the robot main body 101 to transfer the power storage device 103a from the robot 100 to the power supply device 200 and transfer the power storage device 103c from the power supply device 200 to the robot 100, by controlling the robot driver 101c. That is, the robot main body 101 executes replacement of the power storage device (step S110).

If the replacement of the power storage device has been completed (Yes in step S111), the robot controller 104 proceeds to step S112, and if the replacement of the power storage device has not been completed (No in step S111), the robot controller 104 returns to step S110. In step S112, the robot controller 104 transmits information indicating that the replacement of the power storage device has been completed, to the power supply device 200. This transmission may be performed by wireless communication using the communication device 106. Alternatively, the transmission may be transmission using an output device (not shown) which outputs a signal such as light or sound to the power supply device 200, or the like.

Next, the power supply controller 203 of the power supply device 200 performs control so as to cause the power supply device 200 to travel to the original location (step S113). The original location is the location before the start of conveyance of the power storage device 103c to the robot 100, and may be, for example, a determined standby location.

By executing the processes in steps S101 to S113, the power supply system 1 can replace the power storage device 103a or 103b of the robot 100 with a new power storage device 103c when needed. In addition, the time during which the work and movement of the robot 100 are restricted is limited to the time during which the power storage device is replaced, and thus can be reduced to be short.

<Second Operation of Power Supply System 1>

Figure 11:
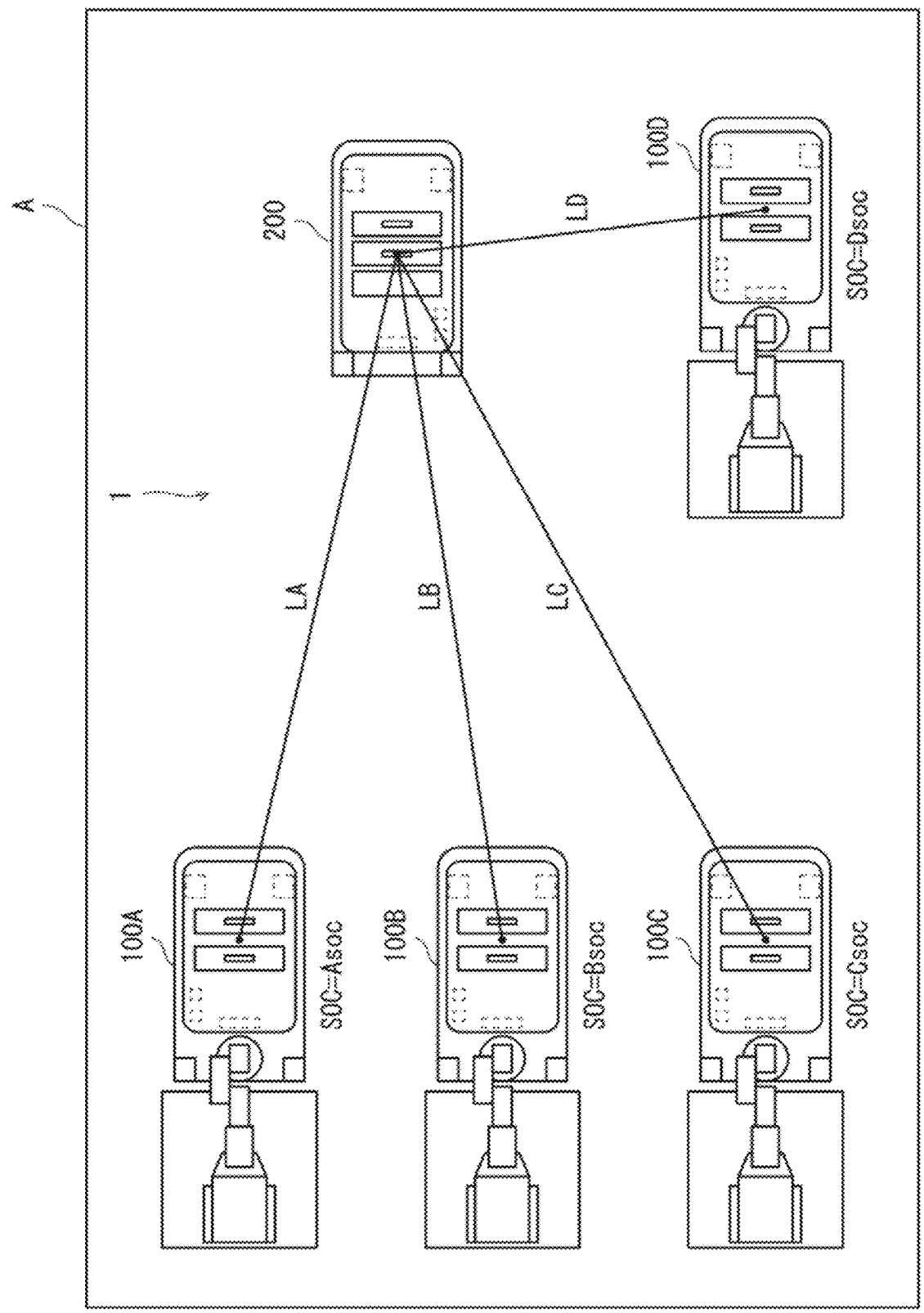
FIG. 11 is a plan view showing an example of arrangement of robots and one power supply device.
Figure 12:
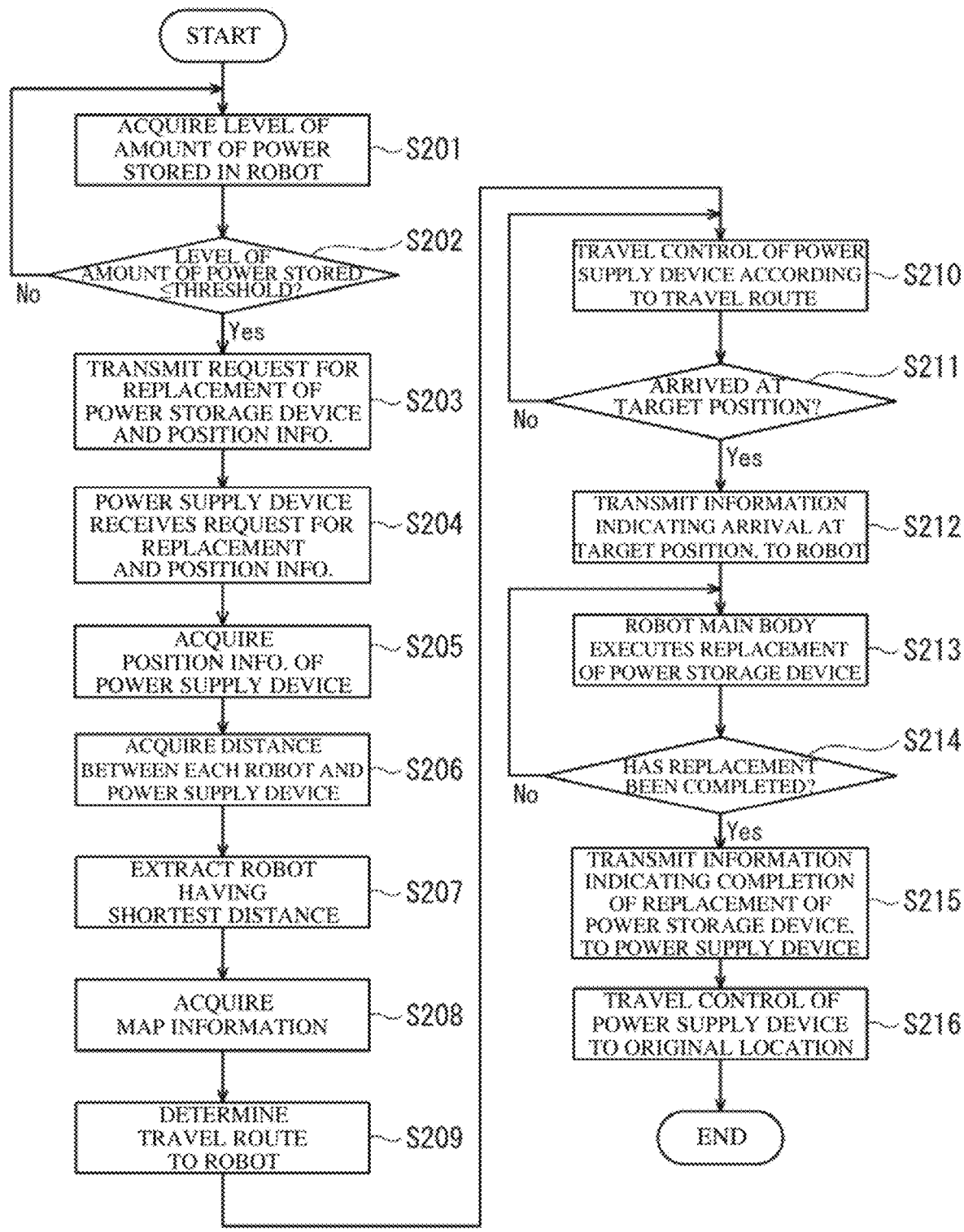
FIG. 12 is a flowchart showing an example of a second operation of the power supply system according to the embodiment.

A second operation of the power supply system 1 according to the embodiment will be described. The second operation is an example of the operation of the power supply system 1 in case that robots 100 and one power supply device 200 exist in the work place of the robot 100. In the following, the second operation will be described for an example shown in FIG. 11. FIG. 11 is a plan view showing an example of arrangement of robots 100 (hereinafter, also referred to as "robots 100A to 100D") and one power supply device 200. FIG. 12 is a flowchart showing an example of the second operation of the power supply system 1 according to the embodiment.

As shown in FIG. 11 and FIG. 12, the robot controller 104 of each of the robots 100A to 100D executes processes in steps S201 to S203 in the same manner as steps S101 to S103 of the first operation. In this example, in step S203, each of all of the robots 100A to 100D transmits information on the amount of power stored including a request for replacement of the power storage device 103a of the robot, and the position information of the robot to the power supply device 200.

Next, in step S204, the power supply controller 203 of the power supply device 200 receives the above information from each of the robots 100A to 100D. The power supply controller 203 may perform processes subsequent to step S204, on the information received within a predetermined period. The predetermined period may be any period, but may be, for example, a time taken for replacing the power storage device of the robot with the power storage device 103c of the power supply device 200.

Next, the power supply controller 203 acquires the position information of the power supply device 200 from the storage unit 203g or the position detector 206 (step S205). Furthermore, the power supply controller 203 acquires distances LA to LD between the respective robots 100A to 100D and the power supply device 200 by using the position information of the respective robots 100A to 100D and the position information of the power supply device 200 (step S206). In this example, the distances LA to LD are linear distances, but may each be a distance along a route which is indicated by the map information and on which the power supply device 200 can travel. Next, the power supply controller 203 extracts the robot 100D having the shortest distance LD from among the distances LA to LD (step S207) and determines the robot 100D as a conveyance target of the power storage device 103c.

Next, the power supply controller 203 acquires the map information of the work place A where the power supply device 200 and the robots 100A to 100D are arranged, from the storage unit 203g (step S208). Moreover, the power supply controller 203 determines a travel route from the power supply device 200 to the robot 100D by using the position information of the robot 100D, the position information of the power supply device 200, and the map information (step S209).

Furthermore, the power supply controller 203 and the robot controller 104 of the robot 100D execute processes in steps S210 to S216 in the same manner as steps S107 to S113 of the first operation.

By executing the processes in steps S201 to S216, the power supply system 1 extracts the robot 100D located closest to the power supply device 200 from among the robots 100A to 100D which request replacement of the power storage device 103a or 103b, and replaces the power storage device 103a or 103b of the robot 100D. Therefore, the time taken for movement of the power supply device 200 is reduced, and efficient replacement of the power storage device 103a or 103b is enabled.

<Third Operation of Power Supply System 1>

Figure 13:
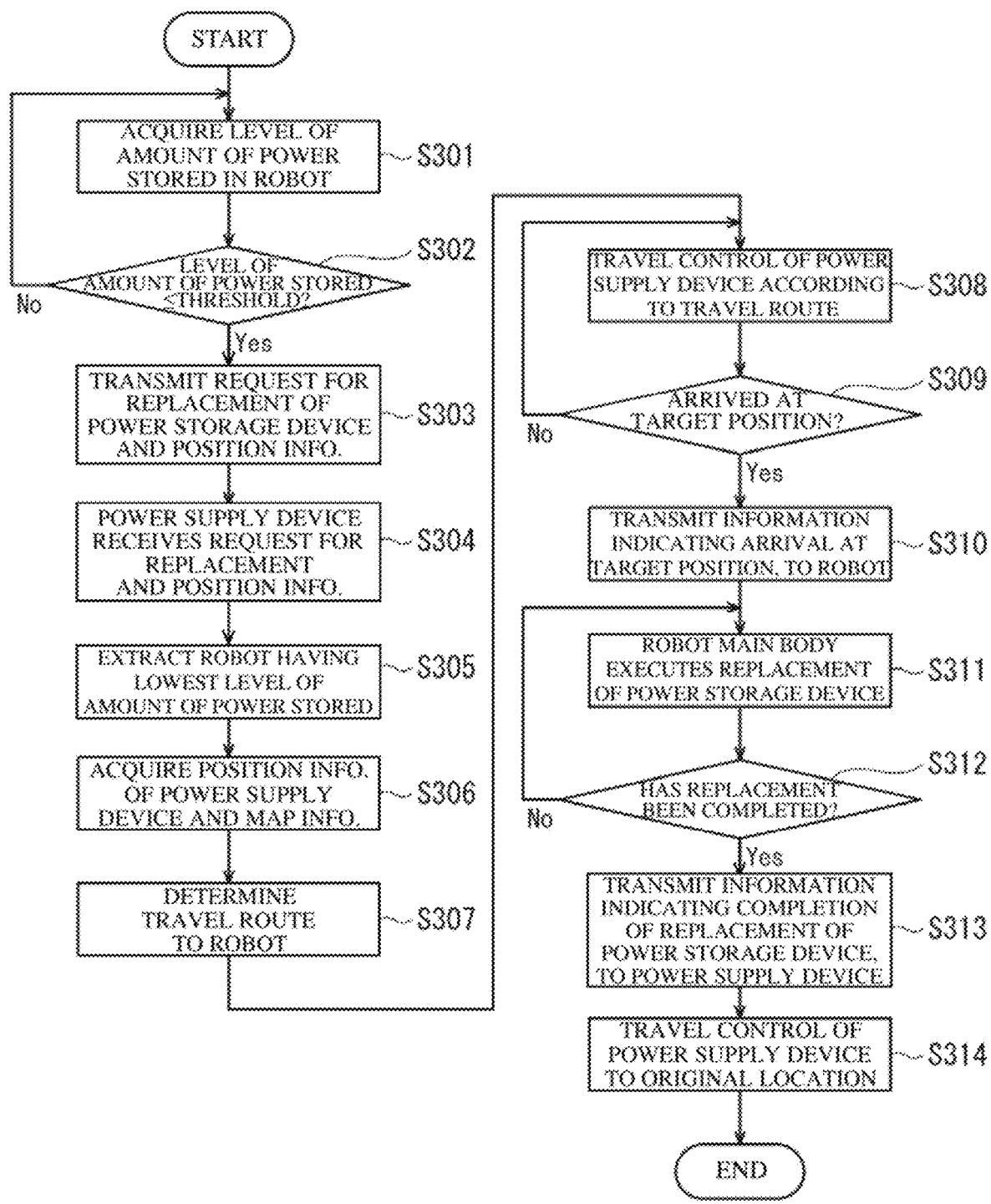
FIG. 13 is a flowchart showing an example of a third operation of the power supply system according to the embodiment.

A third operation of the power supply system 1 according to the embodiment will be described. The third operation is another example of the operation of the power supply system 1 in case that robots 100 and one power supply device 200 exist in the work place of the robot 100. In the following, the third operation will be described for the example shown in FIG. 11. FIG. 13 is a flowchart showing an example of the third operation of the power supply system 1 according to the embodiment.

As shown in FIG. 11 and FIG. 13, the robot controller 104 of each of the robots 100A to 100D executes processes in steps S301 to S303 in the same manner as steps S201 to S203 of the second operation.

Next, in step S304, the power supply controller 203 of the power supply device 200 receives, from each of the robots 100A to 100D, the information about the amount of power stored including a request for replacement of the power storage device 103a, and the position information of the robot. Moreover, the power supply controller 203 extracts the robot having the lowest level of the amount of power stored in the power storage device 103a among the robots 100A to 100D (step S305). In this example, the power supply controller 203 extracts the robot 100C whose SOC is a minimum value Csoc, and determines the robot 100C as a conveyance target of the power storage device 103c. The SOCs of the power storage devices 103a of the respective robots 100A to 100D are denoted by Asoc, Bsoc, Csoc, and Dsoc, and satisfy Asoc>Bsoc>Dsoc>Csoc.

Next, the power supply controller 203 acquires the position information of the power supply device 200 and the map information of the work place A from the storage unit 203g and/or the position detector 206 (step S306). Moreover, the power supply controller 203 determines a travel route from the power supply device 200 to the robot 100C by using the position information of the robot 100C, the position information of the power supply device 200, and the map information (step S307).

Furthermore, the power supply controller 203 and the robot controller 104 of the robot 100C execute processes in steps S308 to S314 in the same manner as steps S107 to S113 of the first operation.

By executing the processes in steps S301 to S314, the power supply system 1 extracts the robot 100C whose level of the amount of power stored in the power storage device 103a or 103b is the lowest, from among the robots 100A to 100D which request replacement of the power storage device 103a or 103b, and replaces the power storage device 103a or 103b of the robot 100C. Therefore, a situation in which the amounts of power stored in the power storage devices 103a and 103b become insufficient to make it impossible for the robots 100A to 100D to operate is prevented.

<Fourth Operation of Power Supply System 1>

Figure 14:
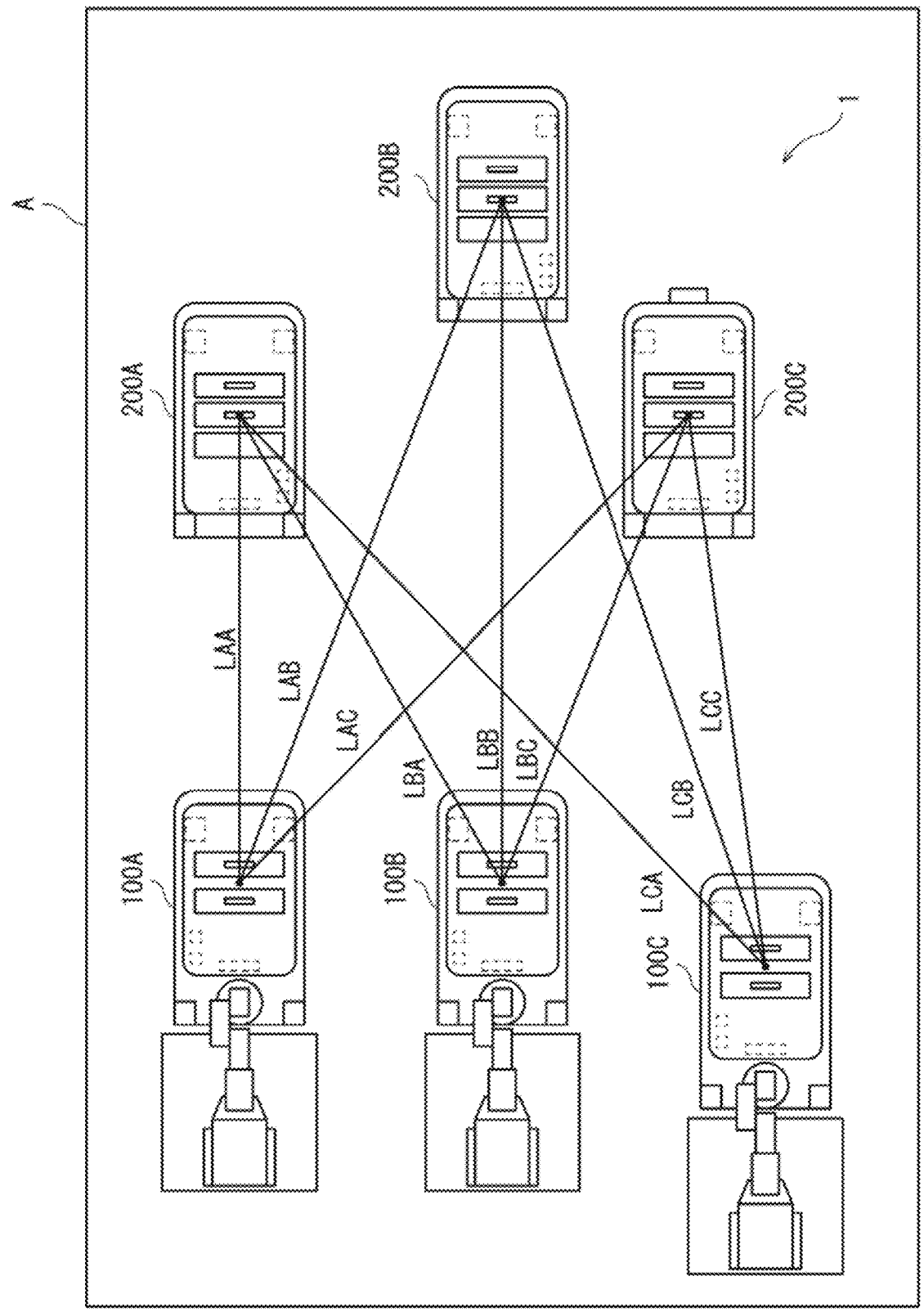
FIG. 14 is a plan view showing an example of arrangement of robots and power supply devices.
Figure 15:
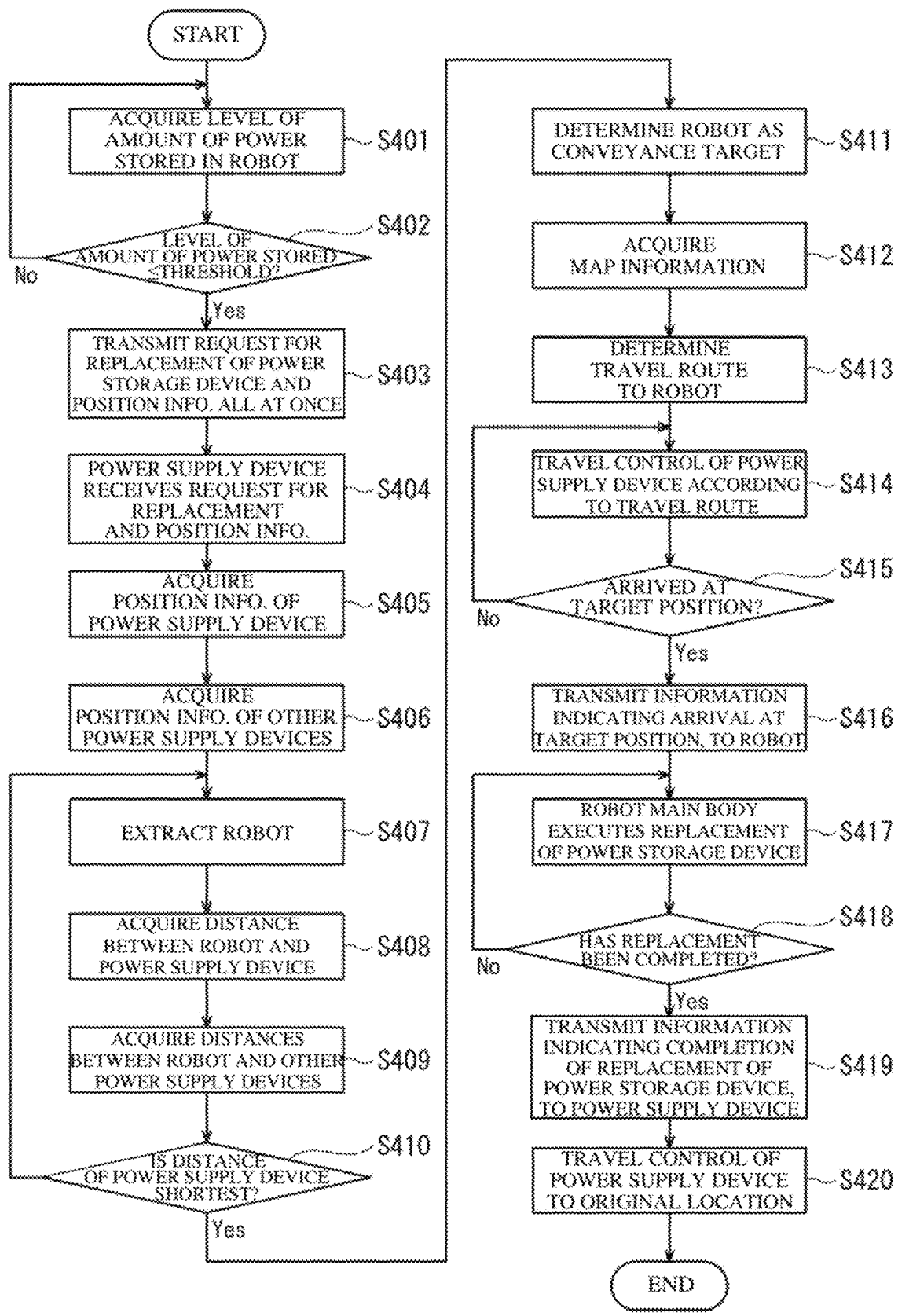
FIG. 15 is a flowchart showing an example of a fourth operation of the power supply system according to the embodiment.

A fourth operation of the power supply system 1 according to the embodiment will be described. The fourth operation is an example of the operation of the power supply system 1 in case that robots 100 and power supply devices 200 exist in the work place of the robot 100. In the following, the fourth operation will be described for an example shown in FIG. 14. FIG. 14 is a plan view showing an example of arrangement of robots 100A to 100C and power supply devices 200 (hereinafter, also referred to as "power supply devices 200A to 200C"). FIG. 15 is a flowchart showing an example of the fourth operation of the power supply system 1 according to the embodiment.

As shown in FIG. 14 and FIG. 15, the robot controller 104 of each of the robots 100A to 100C executes processes in steps S401 to S403 in the same manner as steps S201 to S203 of the second operation. In step S403, each of the robots 100A to 100C transmits information on the amount of power stored including a request for replacement of the power storage device 103a of the robot, and the position information of the robot to all the power supply devices 200A to 200C existing in the work place A, all at once. The following processes subsequent to step S404 are processes of one power supply device, and will be described with the power supply device 200A as an example.

Next, in step S404, the power supply controller 203 of the power supply device 200A receives the above information from each of the robots 100A to 100C. Moreover, the power supply controller 203 acquires the position information of the power supply device 200A from the storage unit 203g or the position detector 206 (step S405). Furthermore, the power supply controller 203 requests and acquires the position information of the other power supply devices 200B and 200C from the power supply devices 200B and 200C (step S406).

Next, the power supply controller 203 extracts one robot from among the robots 100A to 100C from which the information has been received in step S404 (step S407). For example, the robot 100A is extracted. Next, the power supply controller 203 acquires a distance LAA between the robot 100A and the power supply device 200A by using the position information of the robot 100A and the position information of the power supply device 200A (step S408). Moreover, the power supply controller 203 acquires distances LAB and LAC between the robot 100A and the other power supply devices 200B and 200C by using the position information of the robot 100A and the position information of the power supply devices 200B and 200C (step S409).

Next, the power supply controller 203 determines whether the distance LAA between the robot 100A and the power supply device 200A is the shortest among the distances LAA to LAC between the robot 100A and all the power supply devices 200A to 200C (step S410). If the distance LAA is the shortest (Yes in step S410), the power supply controller 203 proceeds to step S411. If the distance LAA is not the shortest (No in step S410), the power supply controller 203 returns to step S407. In step S407, the power supply controller 203 extracts one robot from the robots 100B and 100C which have not been extracted, and repeats the processes in steps S407 to S410.

In step S411, the power supply controller 203 determines the robot 100A extracted in step S407, as a conveyance target of the power storage device 103c. In this example, the distance LAA is the shortest among the distances LAA to LAC. As a result of repeating the processes in steps S407 to S410, if no robot having the shortest distance from the power supply device 200A is extracted, the power supply controller 203 may determine not to convey the power storage devices 103c to any of the robots 100A to 100C from which the information has been received in step S404.

Next, the power supply controller 203 acquires the map information of the work place A where the power supply devices 200A to 200C and the robots 100A to 100C are arranged, from the storage unit 203g (step S412). Next, the power supply controller 203 determines a travel route from the power supply device 200A to the robot 100A by using the position information of the robot 100A, the position information of the power supply device 200A, and the map information (step S413).

Furthermore, the power supply controller 203 and the robot controller 104 of the robot 100A execute processes in steps S414 to S420 in the same manner as steps S107 to S113 of the first operation.

By executing the processes in steps S401 to S420, in the power supply system 1, the power supply device 200A conveys the power storage device 103c to the robot 100A having the shortest distance between the power supply device and the robot as compared to the other power supply devices 200B and 200C. Thus, among all the power supply devices 200A to 200C, the power supply device located closest to the robot that requests replacement of the power storage device 103a or 103b conveys the power storage device 103c to this robot. Therefore, the moving distance of the power supply device is reduced, and efficient replacement of the power storage device 103a or 103b is enabled.

<Effects, Etc.>

The power supply system 1 according to the embodiment includes the movable power supply device 200 including the power storage device 103c as the first power storage device, the robot 100 including the power storage devices 103a and 103b as the second power storage device, and the power supply controller 203 as the controller. The power supply controller 203 performs control for conveying the power storage device 103c to the robot 100 by using the power supply device 200, on the basis of the information about the amounts of power stored in the power storage devices 103a and 103b.

According to the above configuration, the power supply controller 203 can cause the power supply device 200 to convey the power storage device 103c to the robot 100 in accordance with the information about the amount of power stored in the robot 100. Then, when the power storage device 103c is mounted onto the robot 100, the robot 100 can newly receive power supplied by the power storage device 103c instead of the power storage device 103a or 103b. The time taken for power supply to the robot 100 is as short as the time for mounting the power storage device 103c onto the robot 100. Therefore, it is possible to reduce the time taken for power supply to the robot. Furthermore, for example, the power supply device 200 can continuously supply power to robots 100 by sequentially conveying the power storage devices 103c to the robots 100. Moreover, since the robot 100 does not require a wired connection for power supply, the restriction on the movement of the robot 100 can be suppressed.

In the power supply system 1 according to the embodiment, the power supply device 200 may include the traveling device 202 which causes the power supply device 200 to travel, and may travel to the robot 100 by using the traveling device 202 in response to the control of the power supply controller 203. According to the above configuration, the power supply device 200 can autonomously travel to the robot 100. Therefore, automatic conveyance of the power storage device 103c to the robot 100 is enabled.

In the power supply system 1 according to the embodiment, the power supply controller 203 may receive the information about the amounts of power stored in the power storage devices 103a and 103b, from the robot 100 via wireless communication. According to the above configuration, no wired connection is needed for communication between the power supply controller 203 and the robot 100.

The power supply system 1 according to the embodiment may include at least one robot 100 and at least one power supply device 200. Moreover, the power supply controller 203 may determine at least either one of a robot 100 that is a conveyance target of the power storage device 103c or a power supply device 200 that is to convey the power storage device 103c, on the basis of the information about the amounts of power stored in the power storage devices 103a and 103b of at least one robot 100, the information on the position of at least one robot 100, and the information on the position of at least one power supply device 200. According to the above configuration, the power supply controller 203 determines a robot 100 that is a conveyance target of the power storage device 103c and a power supply device 200 that is to convey the power storage device 103c, in consideration of the positional relationship between each robot 100 and each power supply device 200. Therefore, efficient and reliable conveyance of the power storage device 103c by the power supply device 200 is enabled.

The power supply system 1 according to the embodiment may include robots 100. Moreover, the power supply controller 203 may determine the robot 100 closest to the power supply device 200 among the robots 100 that need power supply, as a robot 100 that is a conveyance target of the power storage device 103c, on the basis of the information about the amounts of power stored in the power storage devices 103a and 103b of the robots 100, the information on the positions of the robots 100, and the information on the position of the power supply device 200. According to the above configuration, the moving distance of the power supply device 200 to the robot 100 that is the conveyance target of the power storage device 103c can be reduced. Therefore, efficient conveyance by the power supply device 200 is enabled.

The power supply system 1 according to the embodiment may include power supply devices 200. Moreover, the power supply controller 203 may determine the power supply device 200 closest to the robot 100 that needs power supply, as a power supply device 200 that is to convey the power storage device 103c to the robot 100, on the basis of the information about the amounts of power stored in the power storage devices 103a and 103b of the robot 100, the information on the position of the robot 100, and the information on the positions of the power supply devices 200. According to the above configuration, the power supply device 200 located closest to the robot 100 conveys the power storage device 103c to the robot 100. Therefore, efficient conveyance by the power supply device 200 is enabled.

The power supply system 1 according to the embodiment may include robots 100. Moreover, the power supply controller 203 may determine the robot 100 having the lowest level of the amount of power stored therein among the robots 100 that need power supply, as a robot 100 that is a conveyance target of the power storage device 103c, on the basis of the information about the amounts of power stored in the power storage devices 103a and 103b of the robots 100. According to the above configuration, the power supply device 200 can convey the power storage device 103c to the robot 100 that needs power supply most. Therefore, it is possible to prevent a situation in which the power of the power storage device becomes insufficient, making it impossible for the robot 100 to operate.

In the power supply system 1 according to the embodiment, the power supply device 200 may include the power supply controller 203. According to the above configuration, the power supply device 200 can determine a robot 100 as a conveyance target of the power storage device 103c by itself and execute conveyance of the power storage device 103c to the robot 100. Therefore, execution of automatic conveyance by the power supply device 200 alone is enabled.

The power supply device 200 according to the embodiment is a movable power supply device, and includes the power storage device 103c, and the power supply controller 203 which performs control for conveying the power storage device 103c to the robot 100, on the basis of the information about the amounts of power stored in the power storage devices 103a and 103b included in the robot 100. According to the above configuration, the same effects as those of the power supply system 1 according to the embodiment are obtained.

In the power supply system 1 according to the embodiment, the robot 100 may include, as the third transfer device, the robot main body 101 which transfers the power storage devices 103a and 103b from the robot 100 to the power supply device 200 and transfers the power storage device 103c from the power supply device 200 to the robot 100. According to the above configuration, it is possible to transfer the power storage device by the robot 100. Therefore, it is possible to simplify the structure of the power supply device 200.

<Modification 1>

A power supply system according to Modification 1 of the embodiment will be described. In the power supply system according to Modification 1, a power supply device 2001 performs replacement of a power storage device. Hereinafter, Modification 1 will be described focusing on the differences from the embodiment, and the same points as the embodiment are omitted as appropriate.

The configuration of the power supply device 2001 according to the present modification is the same as that of the embodiment except that a transfer device 210 is included. In the present modification, the transfer device 210 includes an arm and a manipulator (not shown) which are the same as those of the robot main body 101 of the robot 100. The configuration of the transfer device 210 is not limited to the arm and the manipulator, and may be any configuration as long as a power storage device 103 can be transferred. For example, the transfer device 210 may include a crane and a hook or grip at the tip of a crane wire.

The transfer device 210 transfers the power storage device 103c of the power supply device 200 to the robot 100, and transfers the power storage device 103a or 103b of a robot 100 to the power supply device 200. The transfer device 210 is an example of a first transfer device and a second transfer device. In the present modification, the transfer device 210 is composed of one device, but may be composed of two or more devices. For example, in a case where the transfer device 210 is composed of two devices, a first transfer device which transfers the power storage device 103c from the power supply device 200 to the robot 100 and a second transfer device which transfers the power storage device 103a or 103b from the robot 100 to the power supply device 200 may be provided.

Figure 16:
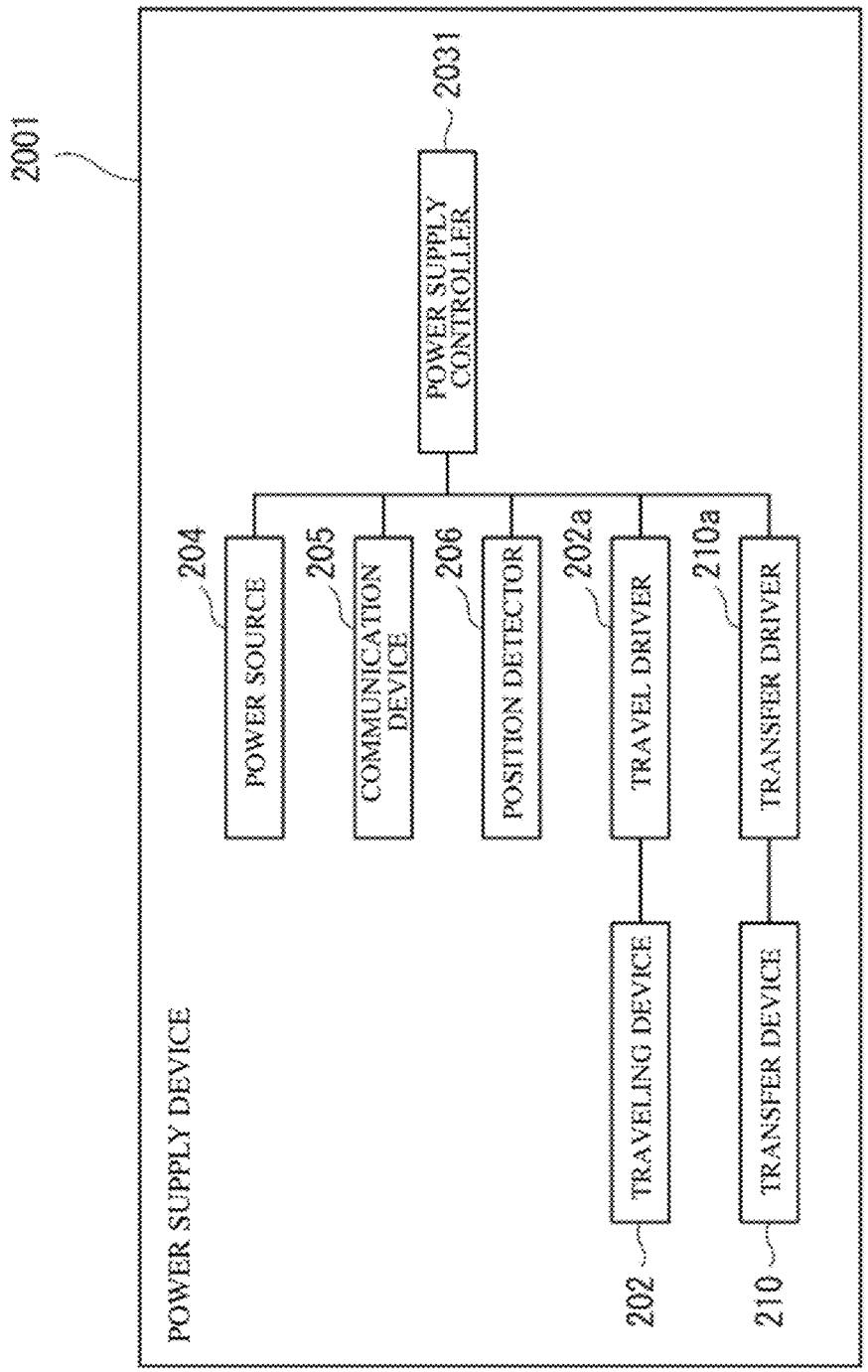
FIG. 16 is a block diagram showing an example of the configuration of a power supply device according to Modification 1.
Figure 17:
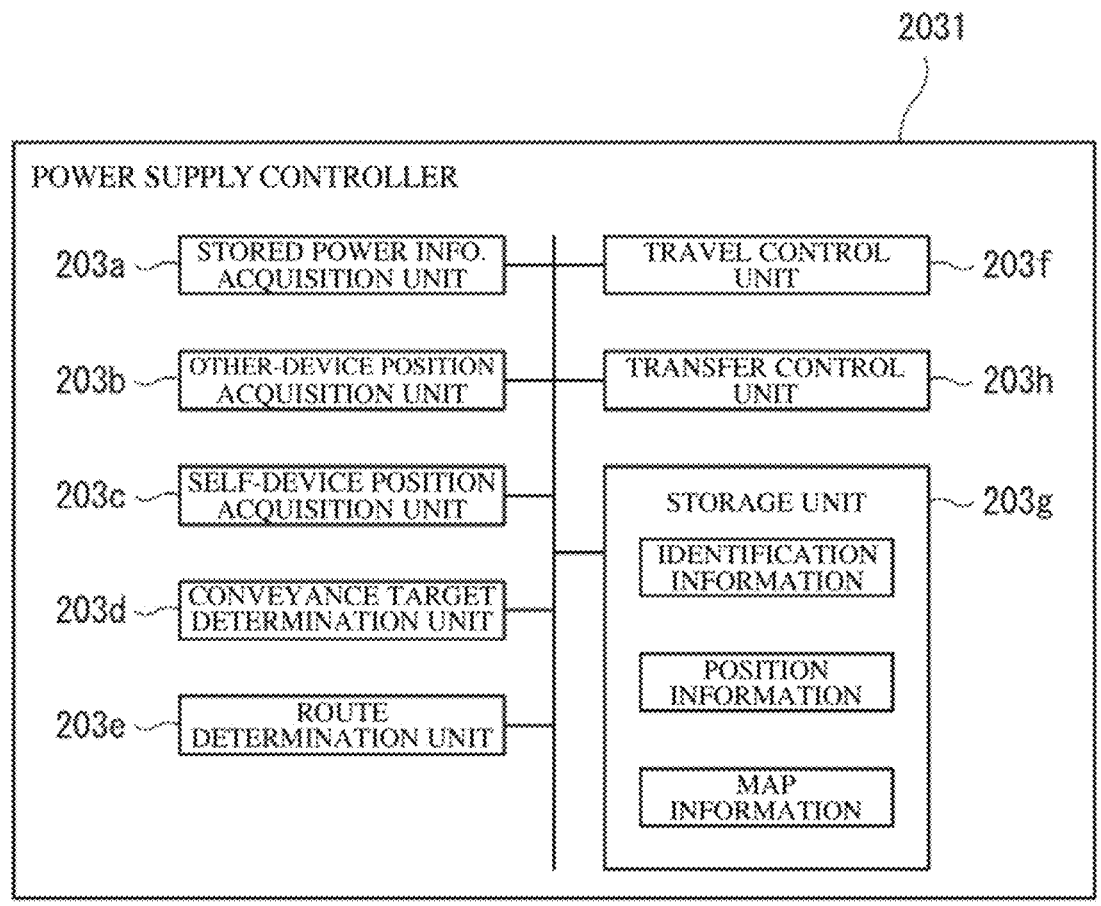
FIG. 17 is a block diagram showing an example of the functional configuration of a power supply controller of the power supply device according to Modification 1.

FIG. 16 is a block diagram showing an example of the configuration of the power supply device 2001 according to Modification 1. FIG. 17 is a block diagram showing an example of the functional configuration of a power supply controller 2031 of the power supply device 2001 according to Modification 1. As shown in FIG. 16, the power supply device 2001 additionally includes the transfer device 210, and includes the power supply controller 2031 instead of the power supply controller 203, with respect to the power supply device 200 according to the embodiment. The transfer device 210 includes a transfer driver 210a, and the transfer driver 210a includes an electric actuator, such as a servomotor, which drives the transfer device 210, or the like. The transfer driver 210a causes the transfer device 210 to perform desired transfer operation under the control of the power supply controller 2031.

As shown in FIG. 17, the power supply controller 2031 additionally includes a transfer control unit 203h with respect to the power supply controller 203 according to the embodiment. The transfer control unit 203h controls the operation of the transfer device 210 by controlling the transfer driver 210a. For example, the transfer control unit 203h causes the transfer device 210 to transfer the power storage device 103a or 103b mounted on the robot 100, to the housing portion 201 of the power supply device 2001. Moreover, the transfer control unit 203h causes the transfer device 210 to transfer the power storage device 103c of the power supply device 200 to the housing portion 108 of the robot 100 after the power storage device 103a or 103b is removed.

Figure 18:
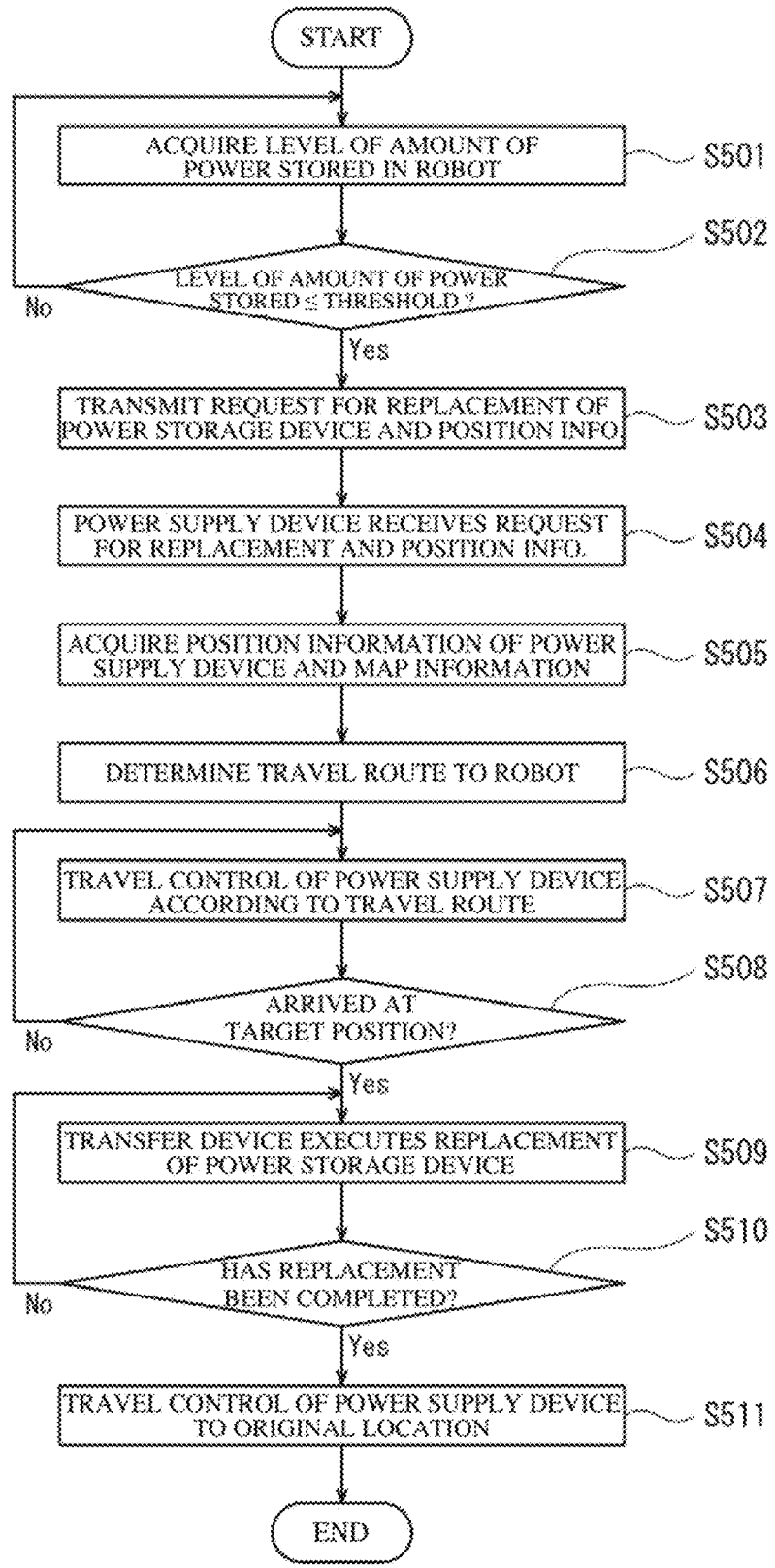
FIG. 18 is a flowchart showing an example of a first operation of a power supply system according to Modification 1.

A first operation of the power supply system according to the present modification will be described. The differences in the second to fourth operations between the embodiment and the present modification are the same as those in the first operation, and thus the description of the second to fourth operations is omitted. FIG. 18 is a flowchart showing an example of the first operation of the power supply system according to Modification 1. As shown in FIG. 18, processes in steps S501 to S507 are the same as those in steps S101 to S107 in the first operation of the embodiment.

In step S508, the power supply controller 2031 of the power supply device 2001 determines whether the power supply device 2001 has arrived at the target position with respect to the robot 100. If the power supply device 2001 has arrived at the target position (Yes in step S508), the power supply controller 2031 proceeds to step S509, and if the power supply device 2001 has not arrived at the target position (No in step S508), the power supply controller 2031 returns to step S507.

In step S509, the power supply controller 2031 causes the transfer device 210 to transfer the power storage device 103a from the robot 100 to the power supply device 2001 and transfer the power storage device 103c from the power supply device 2001 to the robot 100, by controlling the transfer driver 210a. The robot 100 can continue operation such as work by using the power of the power storage device 103b during replacement of the power storage device 103 by the transfer device 210.

Moreover, if the replacement has been completed (Yes in step S510), the power supply controller 2031 proceeds to step S511, and if the replacement has not been completed (No in step S510), the power supply controller 2031 returns to step S509. Next, in step S511, the power supply controller 2031 performs control so as to cause the power supply device 2001 to travel to the original location.

By executing the processes in steps S501 to S511, the power supply system can replace the power storage device 103a or 103b of the robot 100 with a new power storage device 103c when needed, while the robot 100 continues work.

With the power supply system according to Modification 1 as described above, the same effects as those of the power supply system according to the embodiment are obtained. Moreover, the power supply device 2001 according to Modification 1 may include the transfer device 210 which transfers the power storage device 103c to the robot 100, as the first transfer device. According to the above configuration, the power supply device 2001 can autonomously transfer the power storage device 103c to the robot 100. Therefore, automatic mounting of the power storage device 103c onto the robot 100 is enabled.

The power supply device 2001 according to Modification 1 may include the transfer device 210 which transfers the power storage devices 103a and 103b to the power supply device 2001, as the second transfer device. According to the above configuration, the power supply device 2001 can autonomously remove the power storage device 103a or 103b from the robot 100. Therefore, it is possible to automatically remove the unnecessary power storage device 103a or 103b from the robot 100. The transfer device 210 may serve as a first transfer device which transfers the power storage device 103c to the robot 100 and a second transfer device which transfers the power storage device 103a or 103b to the power supply device 2001.

<Modification 2>

A power supply system according to Modification 2 of the embodiment will be described. A power supply system 12 according to Modification 2 is different from that of the embodiment in including a management apparatus 500 which manages a robot 100 and a power supply device 2002. Hereinafter, the present modification will be described focusing on the differences from the embodiment and Modification 1, and the same points as the embodiment and Modification 1 are omitted.

Figure 19:
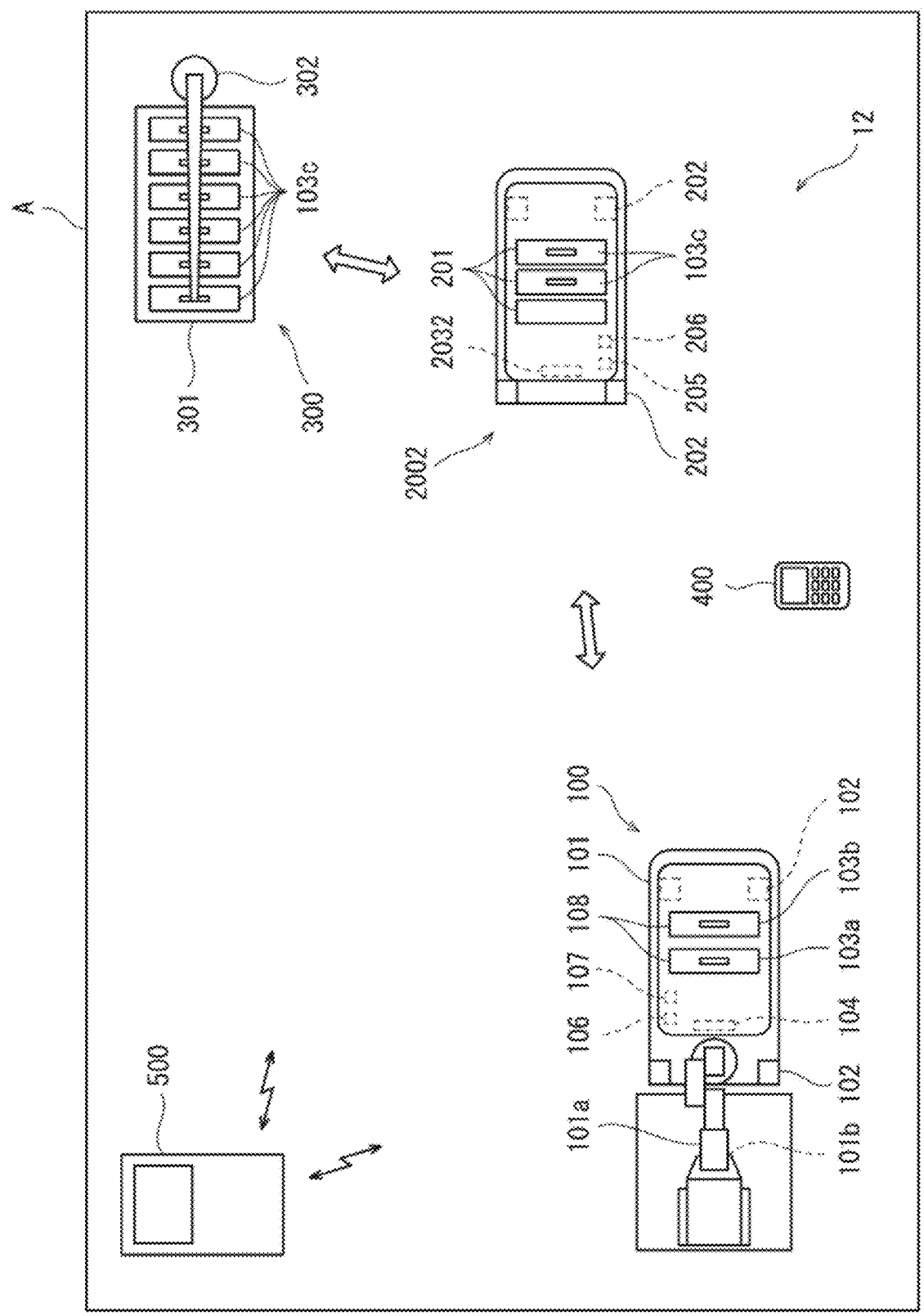
FIG. 19 is a plan view showing an example of the configuration of a power supply system according to Modification 2.
Figure 20:
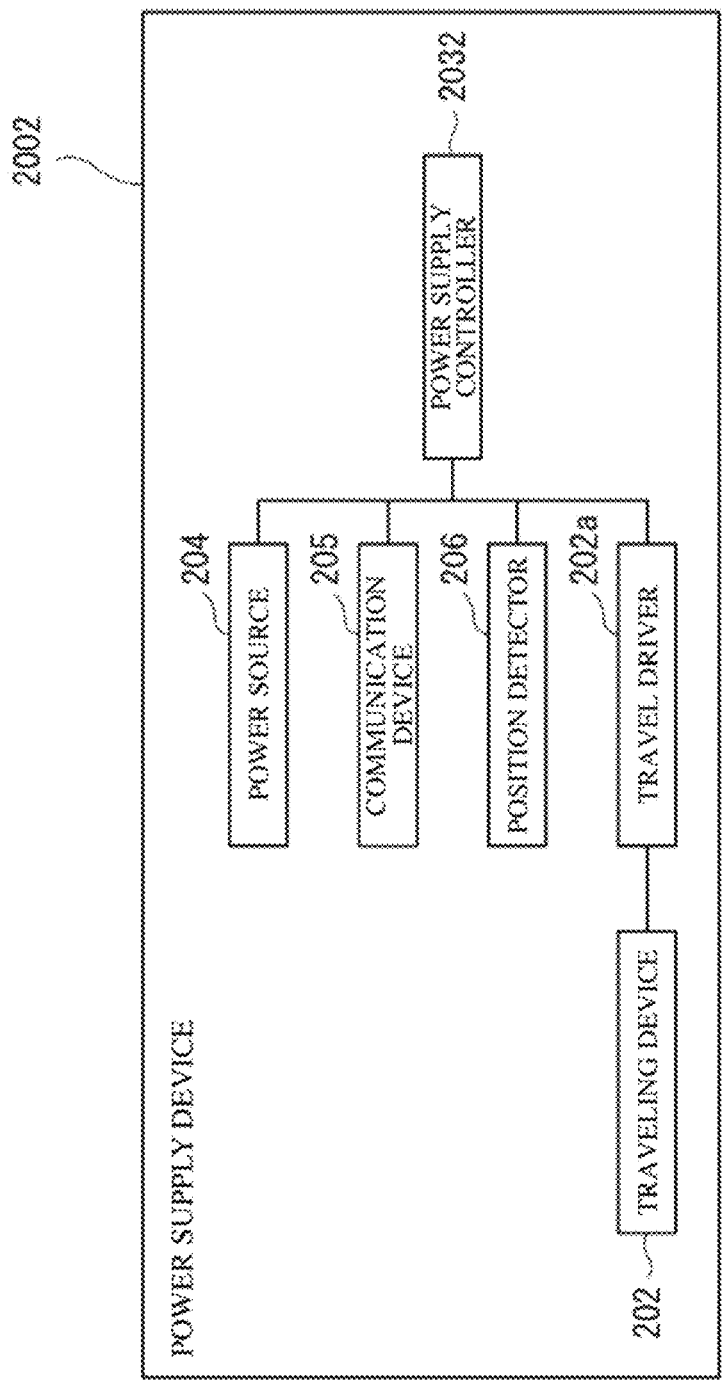
FIG. 20 is a block diagram showing an example of the configuration of a power supply device according to Modification 2.
Figure 21:
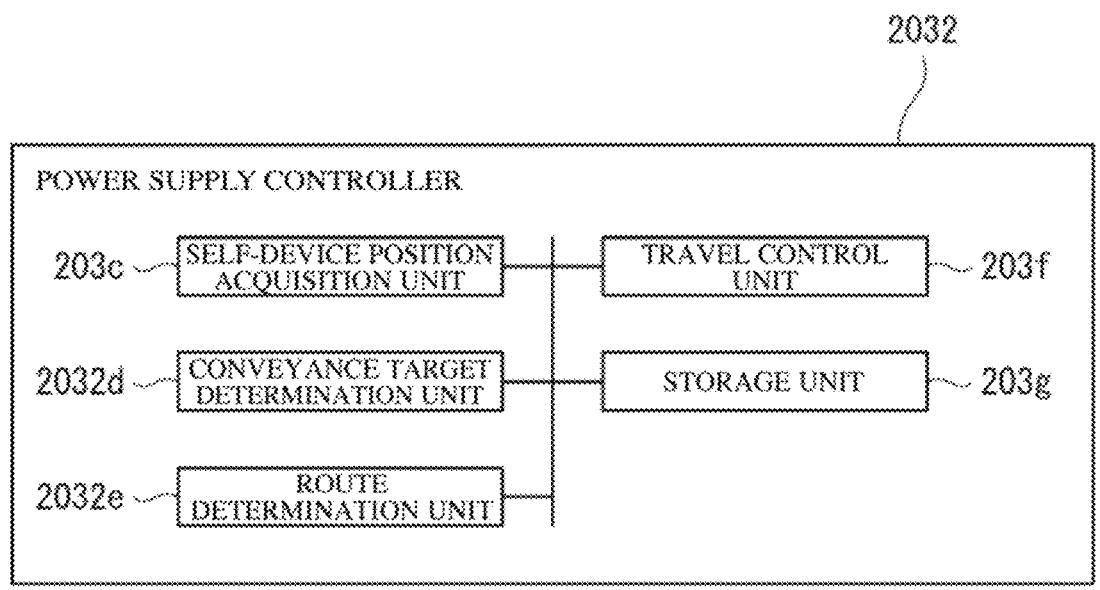
FIG. 21 is a block diagram showing an example of the functional configuration of a power supply controller of the power supply device according to Modification 2.

FIG. 19 is a plan view showing an example of the configuration of the power supply system 12 according to Modification 2. FIG. 20 is a block diagram showing an example of the configuration of the power supply device 2002 according to Modification 2. FIG. 21 is a block diagram showing an example of the functional configuration of a power supply controller 2032 of the power supply device 2002 according to Modification 2. As shown in FIG. 19, the power supply system 12 according to the present modification includes the robot 100, the power supply device 2002, and the management apparatus 500 which wirelessly communicate with each other. The management apparatus 500 manages one or more robots 100 and one or more power supply devices 2002. An example of the management apparatus 500 is a computer device.

As shown in FIG. 20, the power supply device 2002 includes the power supply controller 2032 instead of the power supply controller 203 according to the embodiment. As shown in FIG. 21, the power supply controller 2032 includes a self-device position acquisition unit 203c, a conveyance target determination unit 2032d, a route determination unit 2032e, a travel control unit 203f, and a storage unit 203g. The functions of the self-device position acquisition unit 203c, the travel control unit 203f, and the storage unit 203g are the same as those of the embodiment.

The communication device 205 of the power supply device 2002 wirelessly communicates with the management apparatus 500, but may also wirelessly communicate with the robot 100 and another power supply device 2002. In addition, the self-device position acquisition unit 203c of the power supply controller 2032 transmits the position information of the power supply device 2002 to the management apparatus 500 via the communication device 205. However, as described below, the management apparatus 500 may detect the position of the power supply device 2002.

The conveyance target determination unit 2032d receives information on the robot 100 determined as a conveyance target of the power storage device 103c by the management apparatus 500, from the management apparatus 500 via the communication device 205, and determines this robot 100 as a conveyance target.

The route determination unit 2032e receives a travel route, from the power supply device 2002 to the robot 100 that is the conveyance target of the power storage device 103c, determined by the management apparatus 500, from the management apparatus 500 via the communication device 205, and determines this travel route as a travel route of the power supply device 2002.

Figure 22:
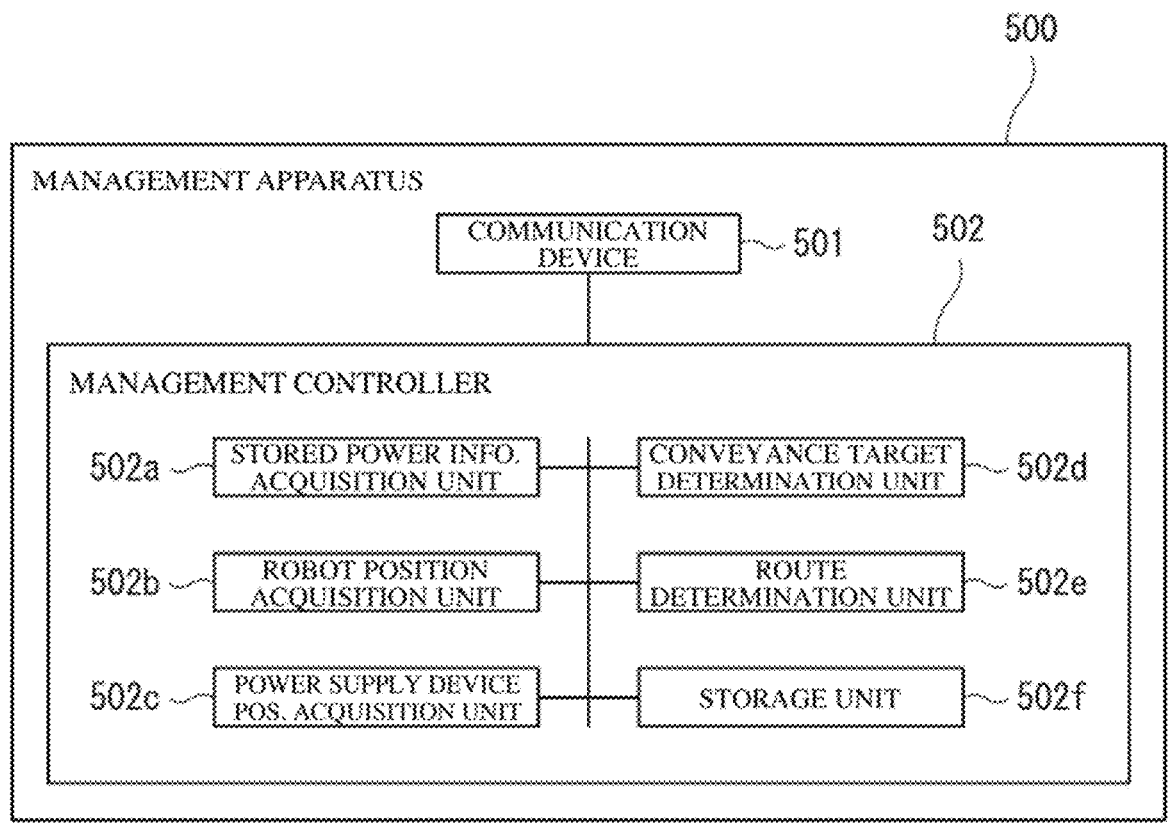
FIG. 22 is a block diagram showing an example of the configuration of a management apparatus and the functional configuration of a management controller according to Modification 2.

FIG. 22 is a block diagram showing an example of the configuration of the management apparatus 500 and the functional configuration of a management controller 502 according to Modification 2. As shown in FIG. 22, the management apparatus 500 includes a communication device 501 and the management controller 502. The communication device 501 includes a wireless communication circuit and communicates with the robot 100 and the power supply device 2002. For example, the communication device 501 receives information about the amounts of power stored in the power storage devices 103a and 103b, and position information of the robot 100 from the robot 100, and receives position information of the power supply device 2002 from the power supply device 2002. In addition, the communication device 501 transmits a command for conveyance of the power storage device 103c to the robot 100 that is the conveyance target of the power storage device 103c, and a travel route to the robot 100 that is the conveyance target of the power storage device 103c, to the power supply device 2002.

The management controller 502 includes a stored power information acquisition unit 502a, a robot position acquisition unit 502b, a power supply device position acquisition unit 502c, a conveyance target determination unit 502d, a route determination unit 502e, and a storage unit 502f as functional components. Not all of these functional components are essential.

The storage unit 502f is realized by a storage device, such as a semiconductor memory such as a volatile memory and a non-volatile memory, a hard disk, and an SSD. Similar to the storage unit 203g, the storage unit 502f stores therein identification information of the robot 100, stored power information of the power storage devices 103*a* and 103*b* of the robot 100, position information of the robot 100, identification information of the power supply device 2002, position information of the power supply device 2002, map information, etc.

The functions of the components such as the stored power information acquisition unit 502*a*, the robot position acquisition unit 502*b*, the power supply device position acquisition unit 502*c*, the conveyance target determination unit 502*d*, and the route determination unit 502*e* may be realized by a computer system which includes a processor, such as a CPU, a volatile memory, such as a RAM, a non-volatile memory, such as a ROM, etc. Some or all of the functions of the above components may be realized by the above computer system, may be realized by a dedicated hardware circuit, such as an electronic circuit or an integrated circuit, or may be realized by a combination of the above computer system and the above hardware circuit.

The stored power information acquisition unit 502*a* acquires the information about the amounts of power stored in the power storage devices 103*a* and 103*b*, from the robot 100 via the communication device 501.

The robot position acquisition unit 502*b* acquires the identification information and the position information of the robot 100 from the robot 100 via the communication device 501. The robot position acquisition unit 502*b* may store the identification information and the position information of the robot 100 in the storage unit 502*f* in association with each other. The robot position acquisition unit 502*b* may detect the position of the robot 100. For example, the robot position acquisition unit 502*b* sends a signal to the robot 100, and when the robot controller 104 of the robot 100 receives the signal, the robot controller 104 returns the signal to the management apparatus 500. The robot position acquisition unit 502*b* can detect the position of the robot 100 with respect to the management apparatus 500 on the basis of the time for which the signal is sent back and forth between the management apparatus 500 and the robot 100, the direction in which the signal is received, and the like.

The power supply device position acquisition unit 502*c* acquires the identification information and the position information of the power supply device 2002 from the power supply device 2002 via the communication device 205. The power supply device position acquisition unit 502*c* may store the identification information and the position information of the power supply device 2002 in the storage unit 502*f* in association with each other. Similar to the robot position acquisition unit 502*b*, the power supply device position acquisition unit 502*c* may detect the position of the power supply device 2002.

Similar to the conveyance target determination unit 203*d* according to the embodiment, the conveyance target determination unit 502*d* determines whether to perform conveyance of the power storage device 103*c* to the robot 100 on the basis of the information about the amounts of power stored in the power storage devices 103*a* and 103*b* of the robot 100. Moreover, the conveyance target determination unit 502*d* determines a robot 100 that is a conveyance target of the power storage device 103*c* and a power supply device 2002 that is to convey the power storage device 103*c* to the robot 100 that is the conveyance target, on the basis of the information about the amounts of power stored in the power storage devices 103*a* and 103*b* of the robot 100 that needs power supply, the position information of the robot 100, the position information of the power supply device 2002, etc. The conveyance target determination unit 502*d* transmits a command for conveyance of the power storage device 103*c* to the robot 100 determined as the conveyance target, to the determined power supply device 2002.

Similar to the route determination unit 203*e* according to the embodiment, the route determination unit 502*e* determines a travel route for moving the power supply device 2002 determined by the conveyance target determination unit 502*d*, to the robot 100 determined as the conveyance target by the conveyance target determination unit 502*d*. The route determination unit 502*e* transmits information on the determined travel route to the power supply device 2002.

As described above, the management apparatus 500 manages the level of the amounts of power stored in the power storage devices 103*a* and 103*b* of at least one robot 100, and the position of the robot 100, and manages the position of at least one power supply device 2002. Moreover, the management apparatus 500 determines a robot 100 that is a conveyance target of the power storage device 103*c* and a power supply device 2002 that is to convey the power storage device 103*c* to the robot 100 that is the power supply target, and causes the power supply device 2002 to execute conveyance. Such a management apparatus 500 has some of the functions of the power supply controller 203 according to the embodiment.

With the power supply system 12 according to Modification 2 as described above, the same effects as those of the embodiment are obtained. Moreover, in the power supply system 12, the management controller 502 as a controller may be arranged separately from the robot 100 and the power supply device 2002. According to the above configuration, the throughput of the robot controller 104 of the robot 100 and the power supply controller 2032 of the power supply device 2002 can be reduced. Therefore, it is possible to reduce the cost of the robot 100 and the power supply device 2002.

In the present modification, the management apparatus 500 causes the power supply device 2002 to execute conveyance of the power storage device 103*c* by transmitting a command and information to the power supply device 2002, but is not limited thereto. The management apparatus 500 may remotely control some or all of the functions of the power supply device 2002 via the communication device 501. The terminal device 400 may also serve as the management apparatus 500.

Other Embodiments

Although the examples of the embodiment of the present disclosure have been described above, the present disclosure is not limited to the above embodiment and modifications. That is, various modifications and improvements may be made within the scope of the present disclosure. For example, modes in which various modifications are applied to the embodiment and the modifications and modes constructed by combining the components in different embodiments and modifications are also included within the scope of the present disclosure.

For example, in the embodiment and the modifications, the power supply device, the robot, and the management apparatus are configured to wirelessly communicate with each other, but are not limited thereto. For example, the power supply device, the robot, and the management apparatus may be configured to output light, sound, or a combination thereof and receive them. Light, sound, and a combination thereof can indicate information about the amount of power stored in the power storage device, the position information of each device, etc.

In the embodiment and the modifications, the power supply device and the robot are configured to acquire their own positions by using the GPS and/or IMU, but are not limited thereto. For example, the power supply device and the robot may acquire the positions of the power supply device and the robot by detecting the magnetic field of a magnet embedded in a floor surface. Alternatively, the positions of the power supply device and the robot may be detected by analyzing images of the power supply device and the robot captured by a camera. Still alternatively, distance measuring sensors, such as a laser sensor, a laser lidar, and an ultrasonic sensor, may be provided, and the positions of the power supply device and the robot may be detected using the measured values thereof.

In the embodiment and the modifications, the power supply device may include a detector which detects whether or not any power storage device 103c is put therein. For example, such a detector may be a camera which captures an image of the housing portions 201, a load sensor which measures the load acting on the housing portions 201, a laser lidar or an ultrasonic sensor which scans the housing portions 201 with a laser or an ultrasonic wave, or the like. The controller of the power supply device may detect the presence/absence and the number of power storage devices 103c in the housing portions 201 by using the image of the camera, the measured value of the load sensor, or the scanning result of the laser lidar or the ultrasonic sensor.

In the embodiment and the modifications, the robot main body 101 of the robot 100 or the transfer device 210 of the power supply device 2001 performs the operation of replacing the power storage device 103 of the robot 100, but the present disclosure is not limited thereto. For example, the transfer device 210 and the robot main body 101 may cooperate. That is, transfer of the power storage device 103a or 103b from the robot 100 to the power supply device may be performed by either one of the transfer device 210 or the robot main body 101, and transfer of the power storage device 103c from the power supply device to the robot 100 may be performed by the other of the transfer device 210 and the robot main body 101.

In the embodiment and the modifications, the robot main body 101 and the transfer device 210 are each configured as a vertical articulated robot, but is not limited thereto. For example, the robot main body 101 and the transfer device 210 may each be configured as a horizontal articulated robot, a polar coordinate robot, a cylindrical coordinate robot, a Cartesian coordinate robot, a vertical articulated robot, or another robot. The robot main body 101 and the transfer device 210 each include one arm, but may each include two or more arms.

The invention claimed is:

1. A power supply system, comprising:
a power supply device including a first power storage device and control circuitry; and
a plurality of robots, each robot needing power supply and each robot including a second power storage device, wherein
the control circuitry of the power supply device is configured to
acquire, from each robot of the plurality of robots, power information indicating an amount of power stored in the second power storage device of the robot and position information indicating a position of the robot;
determine a robot of the plurality of robots which is closest to the power supply device and which needs power supply, as being a conveyance target of the first power storage device, based on (i) the power information acquired from each robot of the plurality of robots, (ii) the position information acquired from each robot of the plurality of robots, and (iii) information indicating a position of the power supply device; and
control the power supply device to convey the first power storage device to the robot, based on the power information of the robot.

2. The power supply system according to claim 1, wherein the power supply device further includes a traveling device for the power supply device to travel to the robot in response to control of the control circuitry.

3. The power supply system according to claim 1, wherein the power supply device further includes a first transfer device that transfers the first power storage device to the robot.

4. The power supply system according to claim 1, wherein the power supply device further includes a second transfer device that transfers the second power storage device to the power supply device.

5. The power supply system according to claim 1, wherein the robot includes a third transfer device that transfers the second power storage device from the robot to the power supply device and transfers the first power storage device from the power supply device to the robot.

6. The power supply system according to claim 1, wherein the control circuitry receives the power information, on the amount of power stored in the second power storage device, from the robot via wireless communication.

7. The power supply system according to claim 1, wherein the control circuitry determines at least either the robot that is the conveyance target of the first power storage device or the power supply device that is to convey the first power storage device, based on the power information of the plurality of robots, the position information of the plurality of robots, and the information indicating the position of the power supply device.

8. The power supply system according to claim 7, wherein the control circuitry determines the robot having a lowest level of the amount of power stored among the plurality of robots that needs power supply, as the conveyance target of the first power storage device, based on the power information of the plurality of robots.

9. The power supply system according to claim 1, wherein the control circuitry determines the robot having a lowest level of the amount of power stored among the plurality of robots that needs power supply, as the conveyance target of the first power storage device, based on the power information of the plurality of robots.

10. The power supply system according to claim 1, wherein
each robot of the plurality of robots is a corresponding linear distance away from the power supply device, and
the control circuitry determines the robot having a shortest linear distance from the power supply device.

11. The power supply system according to claim 1, wherein
each robot of the plurality of robots is a corresponding distance away from the power supply device along a travel route, and
the control circuitry determines the robot having a shortest distance from the power supply device along the travel route.

12. A power supply device, comprising:
a first power storage device; and
control circuitry configured to acquire, from each robot of a plurality of robots, power information indicating an amount of power stored in a second power storage device of the robot and position information indicating a position of the robot;

determine a robot of the plurality of robots which is closest to the first power storage device and which needs power supply, as being a conveyance target of the first power storage device, based on (i) the power information acquired from each robot of the plurality of robots, (ii) the position information acquired from each robot of the plurality of robots, and (iii) information indicating a position of the first power storage device; and control the first power storage device to convey to the robot, based on the power information of the robot.

13. The power supply device according to claim 12, wherein the control circuitry determines the robot having a lowest level of the amount of power stored among the plurality of robots that needs power supply, as the conveyance target of the first power storage device, based on the power information of the plurality of robots.

14. The power supply device according to claim 12, wherein the control circuitry determines at least either the robot that is the conveyance target of the first power storage device or the power supply device that is to convey the first power storage device, based on the power information of the plurality of robots, the position information of the plurality of robots, and the information indicating the position of the power supply device.

15. The power supply device according to claim 14, wherein the control circuitry determines the robot having a lowest level of the amount of power stored among the plurality of robots that needs power supply, as the conveyance target of the first power storage device, based on the power information of the plurality of robots.

16. The power supply device according to claim 12, further comprising a traveling device for the power supply device to travel to the robot in response to control of the control circuitry.

17. The power supply device according to claim 12, further comprising a first transfer device that transfers the first power storage device to the robot.

18. The power supply device according to claim 12, wherein the control circuitry receives the power information, on the amount of power stored in the second power storage device, from the robot via wireless communication.

19. A power supply method, comprising:

acquiring, from each robot of a plurality of robots, power information indicating an amount of power stored in a second power storage device of the robot and position information indicating a position of the robot, by a control circuitry of a power supply device;

determining a robot of the plurality of robots which is closest to the power supply device and which needs power supply, as being a conveyance target of a first power storage device of the power supply device, based on (i) the power information acquired from each robot of the plurality of robots, (ii) the position information acquired from each robot of the plurality of robots, and (iii) information indicating a position of the power supply device; and controlling, based on the power information of the robot, the power supply device to convey to the robot.

* * * * *